US010812316B2

(12) United States Patent
Male et al.

(10) Patent No.: US 10,812,316 B2
(45) Date of Patent: Oct. 20, 2020

(54) SYSTEMS AND METHODS FOR NETWORK OUTAGE TRACKING

(71) Applicant: Level 3 Communications, LLC, Broomfield, CO (US)

(72) Inventors: James Male, Denver, CO (US); Cecil Sunder, Broomfield, CO (US); Paul J. Yelton, Denver, CO (US); Jennifer L. Moses, Port Allegany, PA (US)

(73) Assignee: Level 3 Communications, LLC, Broomfield, CO (US)

( * ) Notice: Subject to any disclaimer, the term of this patent is extended or adjusted under 35 U.S.C. 154(b) by 617 days.

(21) Appl. No.: 14/319,736

(22) Filed: Jun. 30, 2014

(65) Prior Publication Data

US 2015/0381405 A1 Dec. 31, 2015

(51) Int. Cl.
*H04L 29/08* (2006.01)
*H04L 12/24* (2006.01)

(52) U.S. Cl.
CPC ...... *H04L 41/0631* (2013.01); *H04L 41/5074* (2013.01)

(58) Field of Classification Search
CPC ........................ H04L 12/2489; H04L 41/5074
See application file for complete search history.

(56) References Cited

U.S. PATENT DOCUMENTS

| | | | | |
|---|---|---|---|---|
| 5,490,097 A * | 2/1996 | Swenson | G06Q 10/06 | 700/95 |
| 5,893,906 A * | 4/1999 | Daffin | G06Q 10/10 | 700/100 |
| 5,930,333 A * | 7/1999 | Jabbarnezhad | H04M 3/2254 | 379/14 |
| 9,223,971 B1 * | 12/2015 | Bartolomie | G06F 21/56 | |
| 2006/0233310 A1 * | 10/2006 | Adams, Jr. | H04L 12/2697 | 379/2 |
| 2007/0116185 A1 * | 5/2007 | Savoor | H04M 3/5191 | 379/9 |
| 2008/0155327 A1 * | 6/2008 | Black | H04L 41/5012 | 714/27 |
| 2015/0046578 A1 * | 2/2015 | Caicedo | H04L 67/2809 | 709/224 |

* cited by examiner

*Primary Examiner* — Chris Parry
*Assistant Examiner* — Stephen J Houlihan

(57) ABSTRACT

Implementations described and claimed herein provide systems and methods for investigating, tracking, preventing, and providing accountability for telecommunication network outages, particularly human error outages. In one implementation, a ticket is received for a network outage. The ticket specifies a responsible team and an estimated outage reason for the network outage. The estimated outage reason indicates a human error by the responsible team. A notification of the ticket is provided to the responsible team. The notification prompts an action by the responsible team. The action specifies whether the team made the human error. The ticket is completed based on the action and stored. The completed ticket details a root cause of the network outage and a performance management strategy for preventing future network outages similar to the network outage.

14 Claims, 20 Drawing Sheets

SYSTEMS AND METHODS FOR NETWORK OUTAGE TRACKING

TECHNICAL FIELD

Aspects of the present disclosure relate to investigating, tracking, and preventing service events impacting client satisfaction, among other features and advantages, and in particular to investigating, tracking, preventing, and providing accountability for telecommunication network outages, particularly human error outages.

BACKGROUND

Industries providing services involving a complex technical infrastructure, such as the telecommunications industry, are faced with unique challenges in meeting client expectations and maintaining client satisfaction. For example, a service event, such as a network outage of a telecommunication client, may disrupt, delay, or otherwise impair the services, thereby impacting client satisfaction. Since a telecommunication network or service requires a vast and technologically complex collection of technologies, the service challenges are equally vast and complex. Conventional methods manually investigate such service events. Services involving complex technical infrastructures, however, can be faced with thousands of service events per month. As a result, manually investigating a service event expends significant time and resources to identify the cause of the service event and the personnel responsible, which would require many industries to sacrifice resources dedicated to daily operations and services. Many such manual investigations are further impeded by a cluster of information from the volume of service events in attempting to follow each investigation through to completion, thereby reducing accountability for the service errors. Additionally, even where an investigation is successfully tracked through to completion, there is often no analysis of the causes of the service events to determine how such service events may be prevented.

It is with these observations in mind, among others, that various aspects of the present disclosure were conceived and developed.

SUMMARY

Implementations described and claimed herein address the foregoing problems, among others, by providing systems and methods for investigating, tracking, preventing, and providing accountability for service events impacting client satisfaction, such as telecommunication network outages, particularly human error outages. In one implementation, a ticket is received for a network outage. The ticket specifies a responsible team and an estimated outage reason for the network outage. The estimated outage reason indicates a human error by the responsible team. A notification of the ticket is provided to the responsible team. The notification prompts an action by the responsible team. The action specifies whether the team made the human error. The ticket is completed based on the action and stored. The completed ticket details a root cause of the network outage and a performance management strategy for preventing future network outages similar to the network outage.

In another implementation, a plurality of tickets are received and stored in one or more databases. Each of the tickets include an assigned team for investigating a network outage. The assigned team is selected from a plurality of teams. A status of each of the tickets is tracked. The status is designated based on a responsibility of the assigned team for causing the network outage. Consolidated analytics are generated based on the tracked statuses of the tickets and are output.

In yet another implementation, one or more databases store a plurality of tickets. Each of the tickets include an assigned team for investigating a service event. The assigned team is determined based on an estimated cause of the service event. At least one server is in communication with the one or more databases. The at least one server is configured to track investigation information and performance management information for each of the tickets. The investigation information includes a root cause of the service event and a responsible team accountable for the root cause. The performance management information includes at least one preventative measure to prevent similar service events.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Figure 1:
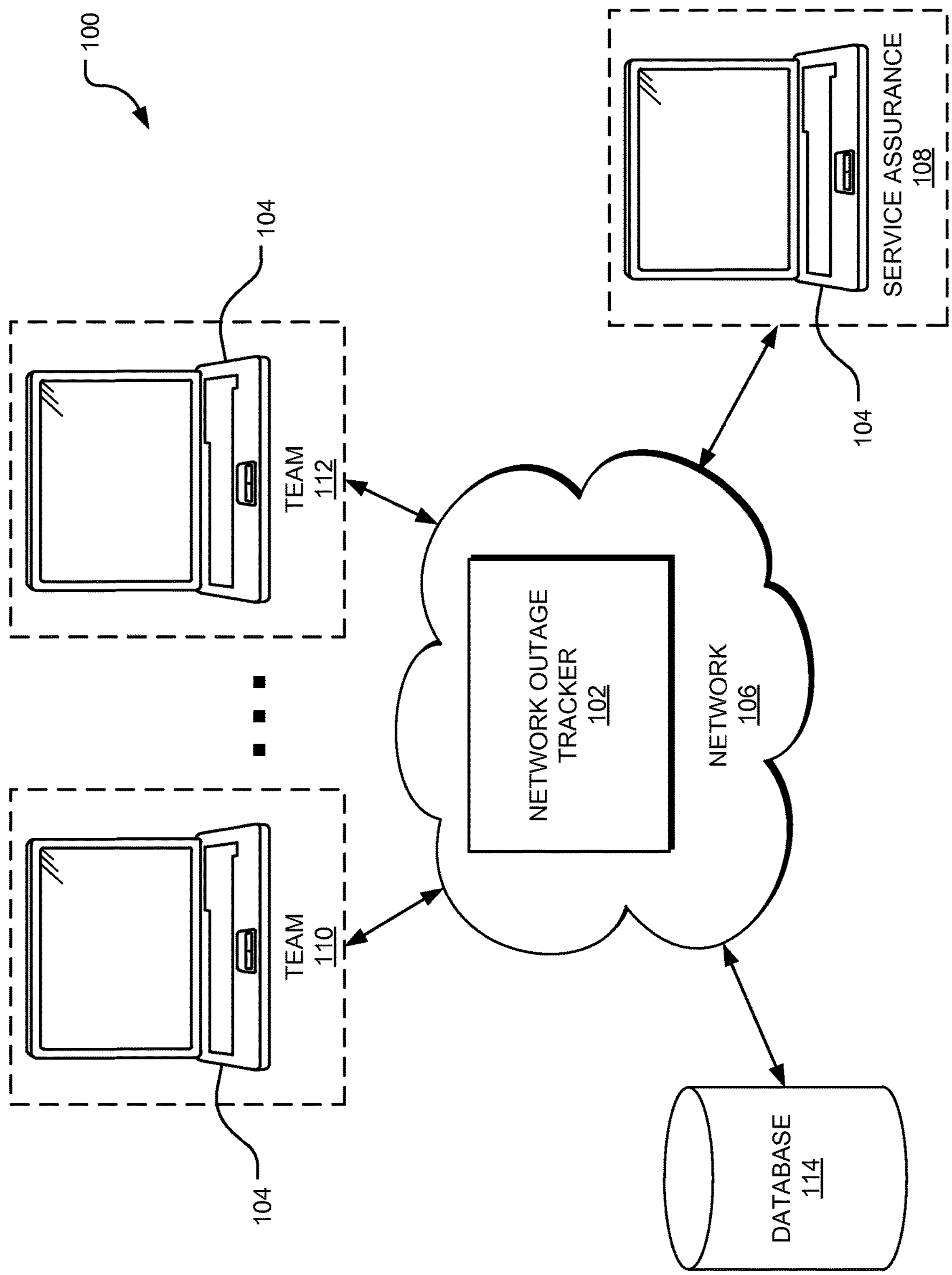
FIG. 1 is an example network environment, including a network outage tracker running on a server or other computing device coupled with a network, for investigating, tracking, preventing, and providing accountability for service events impacting client satisfaction, such as telecommunication network outages, particularly human error outages.

Mistakes are inevitable when humans manage important aspects of complex technical infrastructures, so human error has a consistent presence in services providing complex technical infrastructures. Service events that disrupt, delay, or otherwise impair the services provided to a client are often costly to the client, and as a result, service events caused by human error greatly impact client satisfaction. For example, in the telecommunications industry, the services provided by a telecommunication provider to a client are the backbone that supports the daily operation of the client, and if that backbone suffers an outage, even for a short period of time, the client's operation may be significantly impacted. Human error outages occur when human error causes a network outage for one or more telecommunication clients. Because of the importance of telecommunication services to a company, human error outages can be challenging, resulting in poor client satisfaction, revenue loss, and negative ramifications for the client and/or the telecommunication provider. Despite the challenges of human error outages, the current mindset in the telecommunication industry is generally one of retroactive fire drills rather than proactive prevention. This mindset is particularly damaging in light of the vast numbers of tickets opened each month to investigate network problems, some of which are human error outages.

Accordingly, aspects of the present disclosure generally involve systems and methods for investigating, tracking, preventing, and providing accountability for service events impacting client satisfaction, such as network outages, particularly human error outages. In one aspect, a service assurance group is notified of a network outage for one or more telecommunication clients. The service assurance group opens a ticket for the network outage and provides a cursory analysis of the network outage. The service assurance group determines an estimated cause of the network outage and assigns a team in a department to investigate the network outage. For example, if the service assurance group determines the estimated cause of the network outage to be a human error, the service assurance group determines which team likely made the human error, and assigns the ticket to that team, generating a notification to the assigned team of the ticket. The estimated cause is not always accurate, however, and accountability is important to addressing and preventing human error.

As such, the assigned team investigates the network outage described in the ticket and either validates or disputes the ticket. If the assigned team disputes the ticket because the assigned team did not make the estimated human error, the ticket is reassigned to another team. For example, the assigned team may dispute the ticket because the network outage was not caused by a human error, in which case, the ticket is reassigned back to the service assurance group, or because the human error was made by another team, in which case the ticket is reassigned to the other group. The other group then investigates the ticket and either validates or disputes the ticket. As such, communication across multiple disparate teams is facilitated to ensure accountability for the ticket and a quick solution for the client. Once a team validates the ticket, responsibility for making the human error is accepted, and a root cause of the human error outage and a performance management strategy are input to prevent similar human error outages from occurring. For example, the root cause of the human error outage may be that the order was provisioned incorrectly, so the assigned team may provide additional personnel training or create new reference documentation to prevent future human error outages caused by incorrectly provisioned orders.

To further improve performance and prevent service events impacting client satisfaction, such as human error outages, aspects of the present disclosure generate consolidated analytics based on the statuses of the tickets. For example, the consolidated analytics may include a summary of how many tickets are pending for each team in a department or for a department as a whole. Similarly, the consolidated analytics may include a summary of the progress in completing tickets and preventative measures tied to the tickets. In one aspect, the consolidated analytics are generated in substantially real time to show current trends and commonalities. The consolidated analytics provide a quick reference for the performance of a team in a department or for the department as a whole, thereby increasing accountability and performance improvement.

The various systems and methods disclosed herein generally provide for investigating, tracking, preventing, and providing accountability for service events impacting client satisfaction. The example implementations discussed herein reference the telecommunication industry and network outages, particularly human error outages. However, it will be appreciated by those skilled in the art that the presently disclosed technology is applicable to other industries and service events. For example, utility companies may experience similar network outages or other service events caused by human error or other reasons. Additionally, in the telecommunication industry, fiber cuts resulting in network outages for one or more clients generally impact client satisfaction as much as human error outages and can be expensive to address. Fiber cuts reflect an unplanned event severing fiber that may have various causes ranging from human to natural to animal. For example, a human may inadvertently cut the fiber while installing an irrigation system; a natural disaster, such as a flood may damage the fiber; or an animal may chew through the fiber. Accordingly, the systems and method described herein may be used to investigate, track, prevent, and provide accountability for fiber cuts. Consolidated analytics for the fiber cuts may reveal common causes. For example, if one geographic area is experiencing a high occurrence of fiber cuts caused by rodents chewing through the fiber, protective coating to prevent chewing may be installed in that area.

For a detailed description of an example network environment 100 for investigating, tracking, preventing, and providing accountability for service events impacting client satisfaction, such as telecommunication network outages, particularly human error outages, reference is made to FIG. 1.

In one implementation, a user accesses and interacts with a network outage tracker 102 using a user device 104 to investigate and track network outages via a network 106 (e.g., the Internet). The user may be any authorized personnel, such as a service assurance representative 108, representatives of one or more teams 110, 112 in various departments, or internal or external auditors.

The user device 104 is generally any form of computing device capable of interacting with the network 106, such as a personal computer, terminal, workstation, portable computer, mobile device, tablet, multimedia console, etc. The network 106 is used by one or more computing or data storage devices (e.g., one or more databases 114 or other computing units described herein) for implementing the network outage tracker 102 and other services, applications, or modules in the network environment 100.

In one implementation, the network 106 includes at least one server hosting a website or an application that the user may visit to access the network outage tracker 102 and/or other network components. The server may be a single server, a plurality of servers with each such server being a physical server or a virtual machine, or a collection of both physical servers and virtual machines. In another implementation, a cloud hosts one or more components of the network environment 100. The user devices 104, the server, and other resources connected to the network 106 may access one or more other servers to access to one or more websites, applications, web services interfaces, storage devices, computing devices, or the like that are used for network outage investigation and tracking. The server may also host a search engine that the network outage tracker 102 uses for accessing, searching for, and modifying tickets, investigation information, performance management information, consolidated analytics, and other data.

As can be understood from FIG. 1, the service assurance representative 108 oversees the intake and generation of a ticket for a network outage of one or more clients using a ticketing tool, the network outage tracker 102, or other tools or software. Based on the nature of the network outage, an estimated reason for the network outage is determined. In one implementation, the service assurance representative 108 estimates the reason for the network outage. In another implementation, potential causes of the network outage are automatically identified based on facts provided by the client and/or identified during a preliminary investigation by internal personnel to remedy the network outage and presented for selection by the service assurance representative 108. In one implementation, a human error is identified as a potential cause based on a set of predefined common human errors. These predefined errors, possibly responsible teams, clients, etc., may be provided in a drop down menu or other graphical user interface selectable mechanisms. The interface may further include a notes field, depending on the implementation.

In one implementation, the service assurance representative 108 inputs the estimated cause for the network outage using a ticketing tool, the network outage tracker 102, or other tools or software. Based on the estimated cause, a responsible team (e.g., one of the teams 110-112) in a department is identified. For example, if the estimated outage reason indicates a human error, the team likely to have made the human error is identified. In one implementation, the service assurance representative 108 identifies and assigns a responsible team based on the estimated outage reason. In another implementation, the network outage tracker 102 automatically selects a responsible team from a predefined list stored in the database 114 based on the estimated outage reason. The network outage tracker 102 may allow the user to confirm or alter the proposed responsible team.

The network outage tracker 102 receives a ticket for the network outage specifying the responsible team 110 assigned to investigate the network outage and the estimated outage reason for the network outage. In one implementation, the network outage tracker 102 provides a notification of the ticket to the responsible team 110. The notification may be, for example, an email, a push notification, a banner, an alert, or the like. The notification prompts an action (e.g., validating or disputing) by the responsible team 110 specifying whether the responsible team 110 is responsible for the estimated cause of the network outage. For example, where the estimated outage reason is human error, the action may include validating or disputing the ticket depending on whether the responsible team 110 made the human error. The responsible team 110 validates the ticket where the responsible team 110 made the human error and disputes the ticket where the responsible team 110 did not make the human error. In one implementation, in disputing the ticket, the responsible team 110 specifies one or more reasons for disputing the ticket. For example, the responsible team 110 may dispute the ticket because the network outage was not caused by a human error or because the human error was made by another team 112.

If the responsible team 110 disputes the ticket because the responsible team 110 is not responsible for the estimated cause of the network outage, the network outage tracker 102 reassigns the ticket to another team based on the reasons for dispute. For example, where the responsible team 110 disputes the ticket because the network outage was not caused by a human error, the network outage tracker 102 reassigns the ticket to the service assurance representative 108 for reclassification as a non-human error outage and further investigation. Where the human error was made by the other team 112, the network outage tracker 102 reassigns the ticket to the other team 112 and provides a notification of the ticket to the other team 112. The other team 112 then investigates the ticket and either validates or disputes the ticket. To ensure that a ticket is not repeatedly or circularly reassigned and/or otherwise unaccounted for, the service assurance representative 108 and/or managers on the teams 110-112 may monitor the progress of completing the ticket using the network outage tracker 102. The outage tracker may also include automatic mechanisms prohibiting, such as through thresholds, repeated reassignments to the same team, and generate an alert or other notification when the same occurs.

Once one of the teams 110-112 validates the ticket, responsibility for making the human error is accepted and investigation information and performance management information, including a performance management strategy, are input using the network outage tracker 102. In one implementation, the investigation information includes a root cause of the network outage. For example, the root cause may include a cause of a human error made by one of the teams 110-112 (e.g., order provisioned incorrectly) or a fiber cut. In one implementation, the performance management information includes at least one preventative measure and a deadline for completing the preventative measure. The at least one preventative measure may include any actions items for resolving current problems and/or to prevent similar network outages from occurring. In one implementation, the network outage tracker 102 completes the ticket, specifying the root cause of the network outage and the performance management strategy.

To further improve performance and prevent service events impacting client satisfaction, such as human error outages, the network outage tracker 102 generates consolidated analytics. In one implementation, the network outage tracker 102 receives a plurality of tickets for network outages and stores the tickets in the database 114. The network outage tracker 102 tracks the status of each of the tickets based on the responsibility of the team 110 assigned to the ticket by the service assurance representative 108 or reassigned the ticket by another team 112. For example, the status is designated new where the assigned team 110 is estimated to be responsible for the network outage by the service assurance representative 108 or the other team 112 who had been inaccurately assigned the ticket by the service assurance representative 108. The status is designated validated where the assigned team 110 confirms responsibility for the network outage, and the status is designated disputed where the assigned team 110 disputes responsibility for the causing the network outage.

Based on the tracked statuses, the network outage tracker 102 generates consolidated analytics. In one implementation, the consolidated analytics includes a correlation of the tracked statuses with various attributes, including without limitation, one or more of the teams 110-112, one or more root causes, one or more preventative measures, a dispute status (e.g., dispute in progress or dispute completed), or the like. For example, the consolidated analytics may include a summary of how many tickets are pending action for each team in a department or for a department as a whole. Similarly, the consolidated analytics may include a summary of the progress in completing tickets and preventative measures tied to the tickets. In one implementation, the network outage tracker 102 generates the consolidated analytics in substantially real time to show current trends and commonalities. The consolidated analytics provide a quick reference for the performance of the teams 110-112 individual, in groups, or as a whole, thereby increasing accountability and performance improvement.

Figure 2:
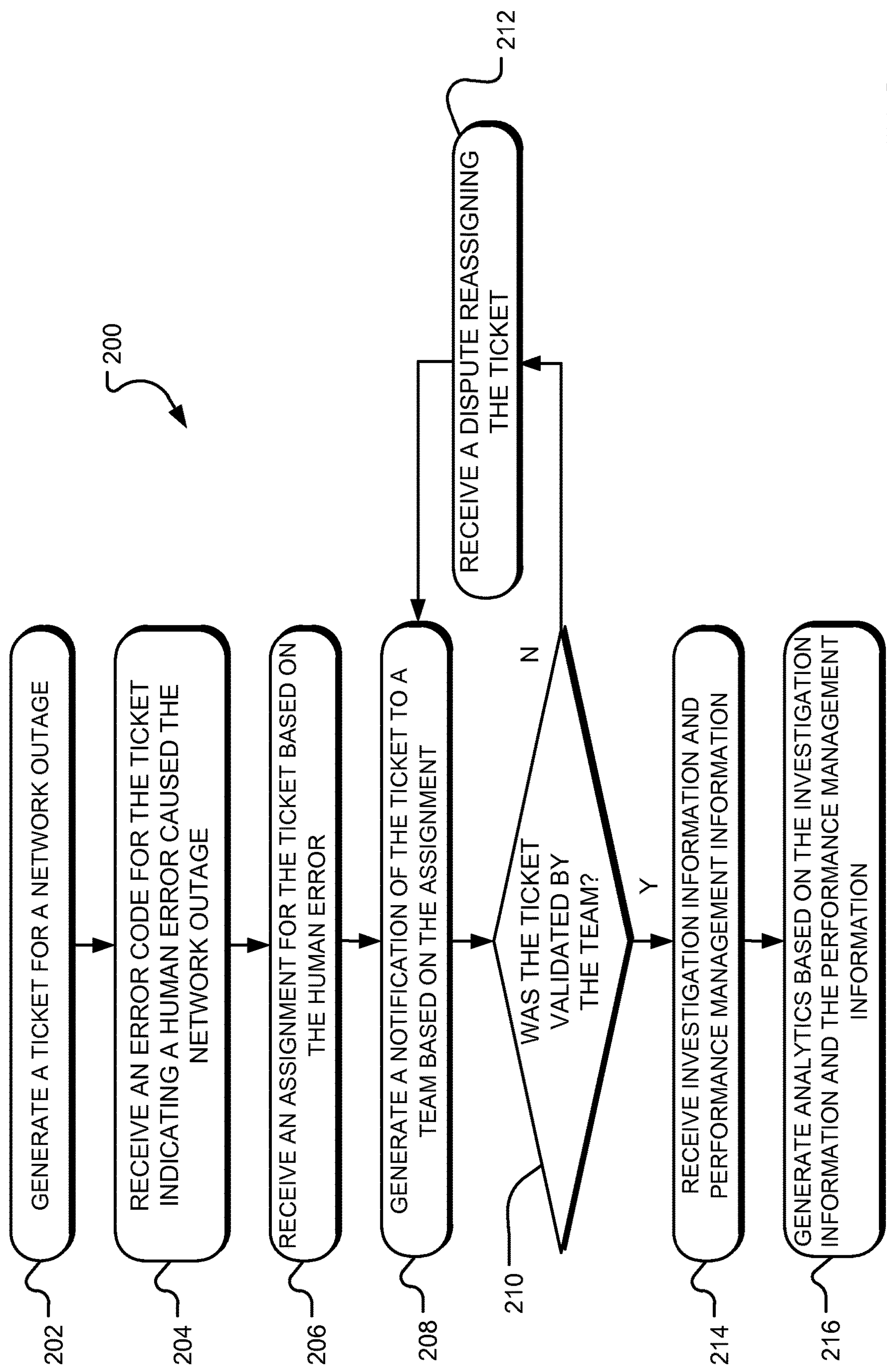
FIG. 2 illustrates example operations for investigating a network outage.

Turning to FIG. 2, example operations 200 for investigating a network outage are shown. In one implementation, an operation 202 generates a ticket for a network outage, and an operation 204 receives an error code for the ticket indicating a human error caused the network outage. The error code may be identified and input by a service assurance representative from a predefined set of error codes relating to various causes of network outages. In one implementation, the operation 204 identifies the error code as a human error based on a set of the error codes corresponding to human error.

An operation 206 receives an assignment for the ticket based on the human error. The assignment identifies a team in a department that is estimated to be responsible for making the human error. In one implementation, a service assurance representative identifies the assigned team from a predefined list based on the nature of the human error. For example, if the human error occurred during activation of telecommunication services, the team likely responsible for the human error is an activation and scheduling team in a service delivery department, so the activation and scheduling team is assigned. An operation 208 generates a notification of the ticket to the assigned team.

An operation 210 determines whether the ticket was validated by the assigned team. If the ticket was disputed by the assigned team, an operation 212 receives a dispute reassigning the ticket. If the ticket was disputed because the network outage was not caused by a human error, the operation 212 reassigns the ticket to the service assurance group for reclassification of the error code to indicate that the network outage was not based on human error. If the ticket was disputed because the human error was caused by another team, the operation 212 reassigns the ticket to the other team. Following the operation 212, the operation 208 sends a notification to the team or service assurance group the ticket was reassigned, and the team investigates the ticket and either validates the ticket or disputes the ticket. Once the ticket is validated by a team, an operation 214 receives investigation information and performance management information. In one implementation, an operation 216 generates analytics based on the investigation and performance management information.

FIGS. 3-19 show example user interfaces generated by the network outage tracker 102 and displayed in a browser window of the user device 104 through which access to and interactions with the tickets, consolidated analytics, and other data are provided. It will be appreciated by those skilled in the art that such depictions are exemplary only and not intended to be limiting.

In one implementation, the network outage tracker 102 generates user interfaces providing various tabs for navigation. For example, as can be understood from FIGS. 3-19, the network outage tracker 102 may generate user interfaces providing tabs 302-308 to navigate between a dashboard, human error outage cases, action items, and analytics. It will be appreciated that the tabs depicted in the user interfaces shown in FIGS. 3-19 are exemplary only and that more or fewer tabs and/or tabs for navigating to different content may be provided. In one implementation, selection of the dashboard tab 302 displays a dashboard showing important data at a glance, including a summary of tickets or action items pending action, as well as links to human error outage tickets in queue to be processed. Selection of the human error outage cases tab 304 displays tickets assigned to a team, where a user may search for a particular ticket, filter tickets based on status, and edit tickets. Selection of the action items tab 306 displays a list of actions, including preventative measures, tied to a particular ticket. Selection of the analytics tab 308 displays consolidated analytics for one or more teams in a department and/or the department as a whole.

Figure 3:
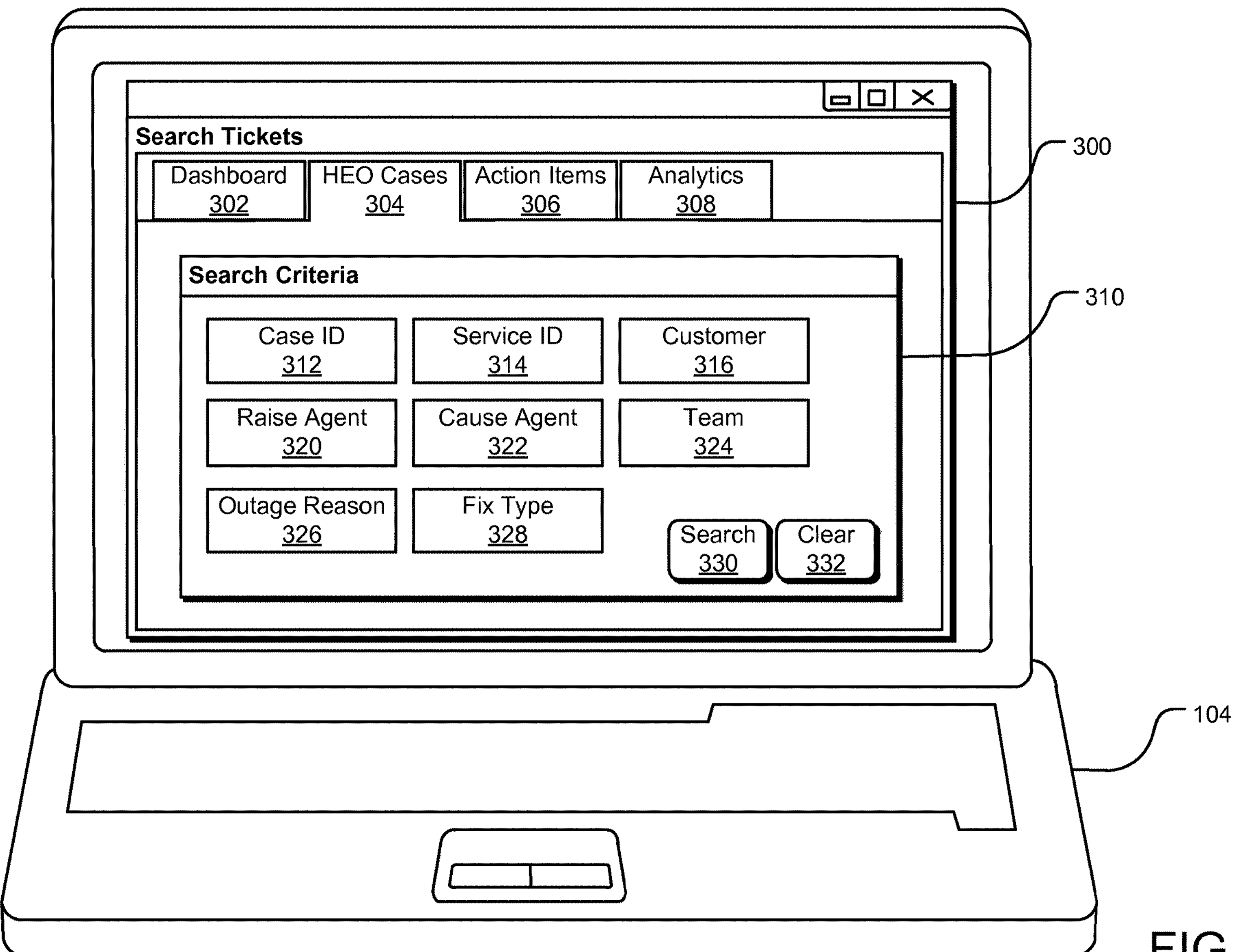
FIG. 3 shows an example search tickets interface displaying search criteria for locating one or more tickets for human error outages.

FIG. 3 shows an example search tickets interface 300 displaying search criteria 310 including various fields 310-328 for inputting information for locating one or more tickets for human error outages. In one implementation, the search criteria 310 includes a case identification number 312 for the ticket, a service identifier 314 referencing the service provided to the customer that is impacted, and a customer field 316 indicating the customer impacted by the network outage described in the ticket. The search criteria 310 also includes fields by search for tickets by various personnel managing different aspects of the case, including, for example, a raise agent 320 and a cause agent 322. A user may also search for tickets by a team 324 assigned to the ticket, outage reason 326, and a fix type 328, which specifies one or more preventative measures. A search button 330 searches the databases 114 for tickets meeting the information input in the search criteria 310, and a cancel button 332 cancels the search.

Figure 4:
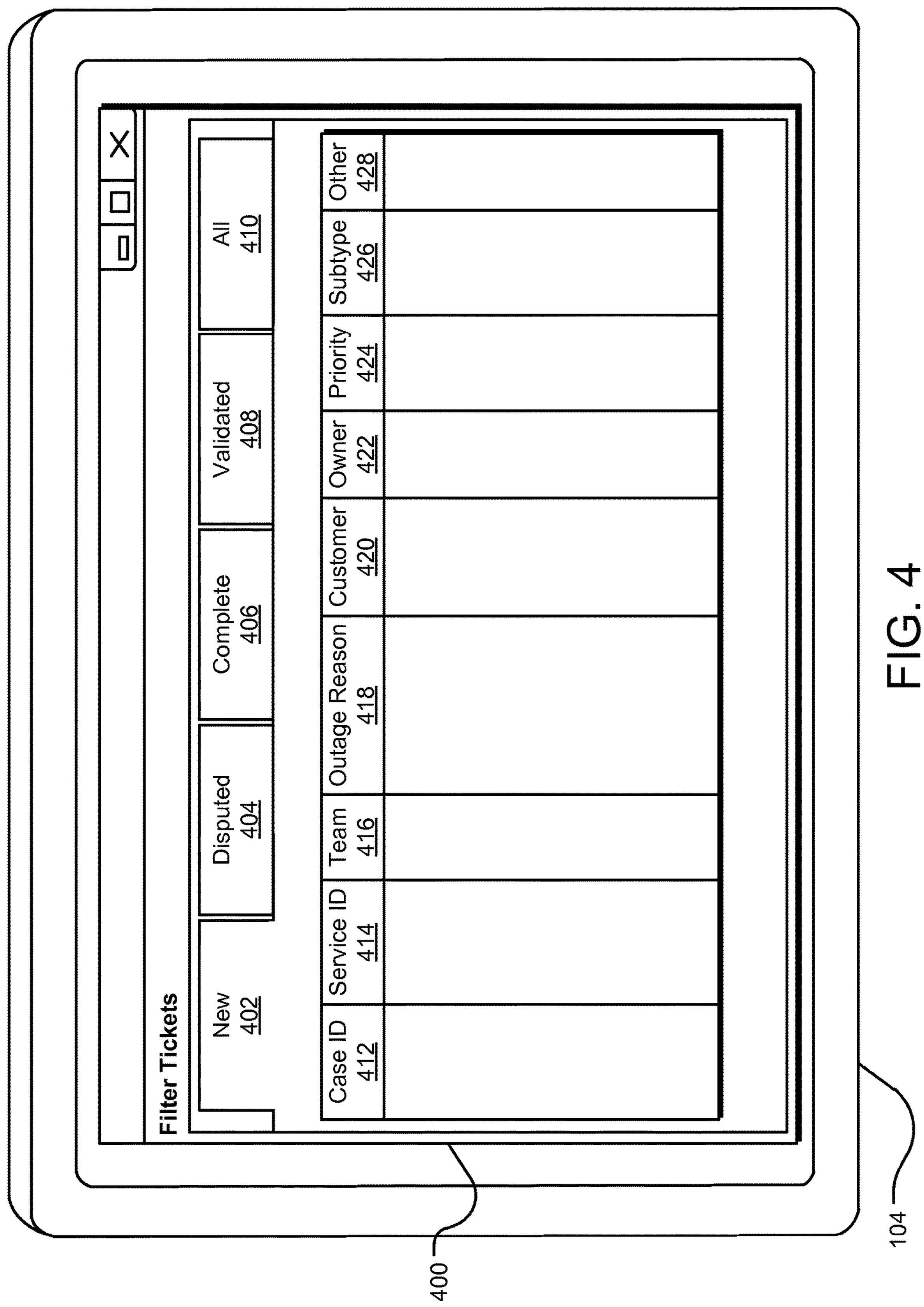
FIG. 4 illustrates an example filter tickets user interface displaying new tickets pending action by an assigned team.

Referring to FIG. 4, an example filter tickets user interface 400 displaying tickets filtered by status using tabs 402-410 is shown. In one implementation, the tickets may be filtered using the tabs 402-410 to show tickets having a new status, a disputed status, a complete status, a validated status, and all tickets, respectively. The new tickets are the tickets that were just assigned and are pending action. The disputed tickets are the tickets that were disputed and triggered to another team to investigate, which the other team is in the process of completing. The completed tickets are the tickets that the reassigned team accepted and closed, and the validated tickets are the tickets that were accepted and closed by the assigned team. For the filtered tickets, a list of information about the tickets is shown with links to the individual tickets for editing. In one implementation, the list includes a case identification number 412, a service identifier 414, an assigned team 416, an outage reason 418, a customer name 420, a ticket owner 422, a priority 424 of the ticket, a subtype 426, and other information 428, such as a department and a bandwidth of the service. The outage reason 418 details the estimated outage cause until replaced with the root cause of the outage. Examples of outage reasons 418 include, without limitation, order provisioned incorrectly, disconnect processed incorrectly, process error, improper configuration change, port shut down in error, active component deleted or removed in error, or the like. The priority 424 details the urgency of addressing the network outage based on the severity. For example, a network out-of-service may have a higher priority than an impaired network. The subtype 416 provides more information about the services impacted, including, for example, Internet Protocol (IP) Virtual Private Network (VPN), unprotected private line, protected private line, dedicated Internet access, or the like.

Figure 5:
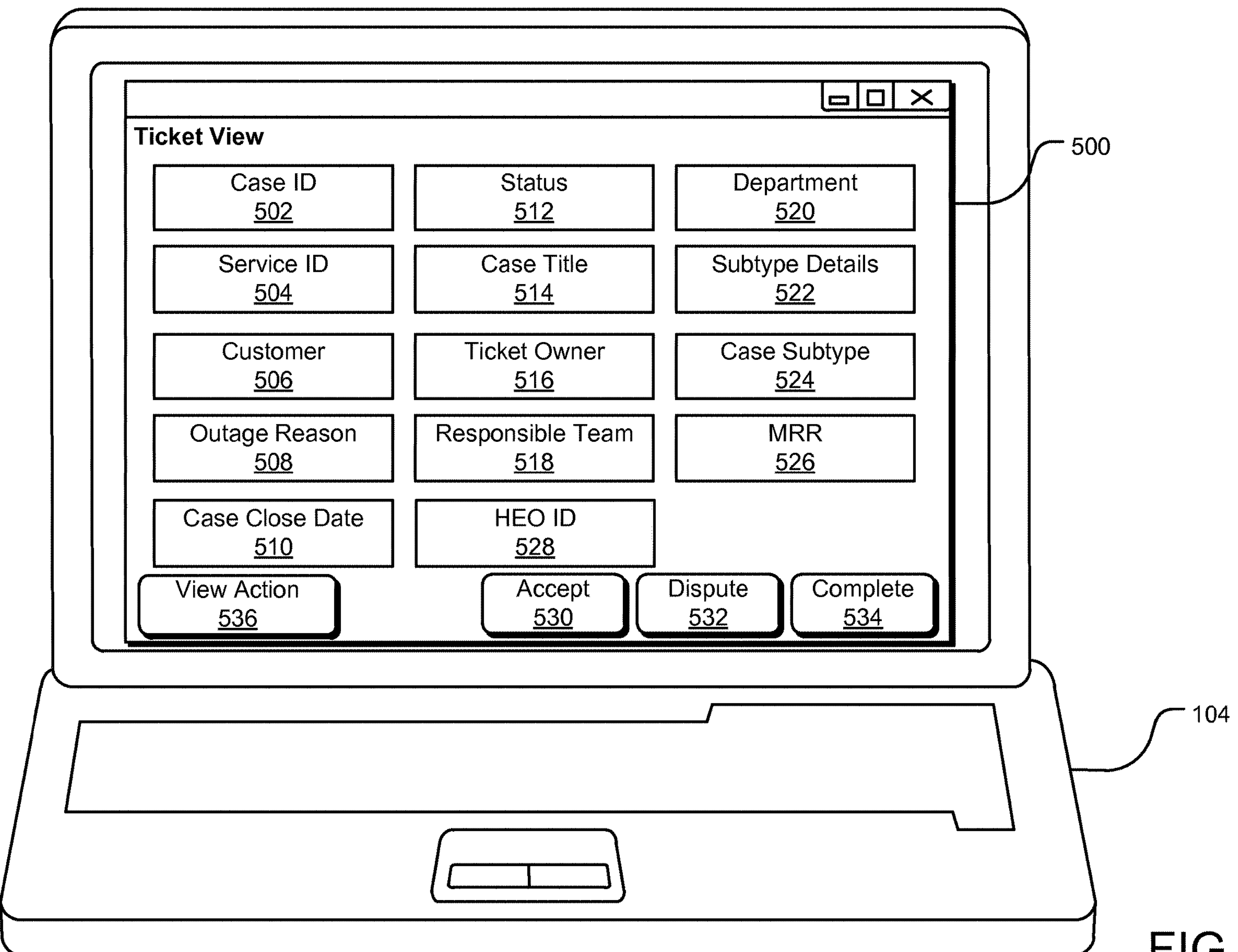
FIG. 5 shows an example ticket view user interface displaying attributes of a ticket pending action by an assigned team.

As can be understood from FIG. 5, an example ticket view user interface 500 displays attributes of a ticket pending action by an assigned team. In one implementation, the ticket includes a case identification number 502, a service identifier 504, a customer 506, an outage reason 508, a case closed date 510, a status 512 (e.g., new, disputed, validated, completed), a case title 514, a ticket owner 516, a responsible team 518 assigned to the ticket, a department 520 in which the team is included, subtype details 522, a case subtype 524, a monthly recurring revenue (MRR) 526, and a human error outage (HEO) identifier. The ticket may also include other information and fields, including, without limitation an outage date and an outage length that detail the time and date of the network outage and how long the outage lasted. The outage reason 508 details the root cause of the network outage. Various buttons 530-536 are presented for action on the ticket. For example, an accept button 530 opens a validate ticket user interface 600 for validating the ticket, and a dispute button 532 opens a dispute ticket interface 700 for disputing the ticket. A complete button 534 closes the ticket once the ticket has been validated or disputed, and a view action button 536 opens view ticket action user interface 800 displaying action items tied to the ticket for performance management.

Figure 6:
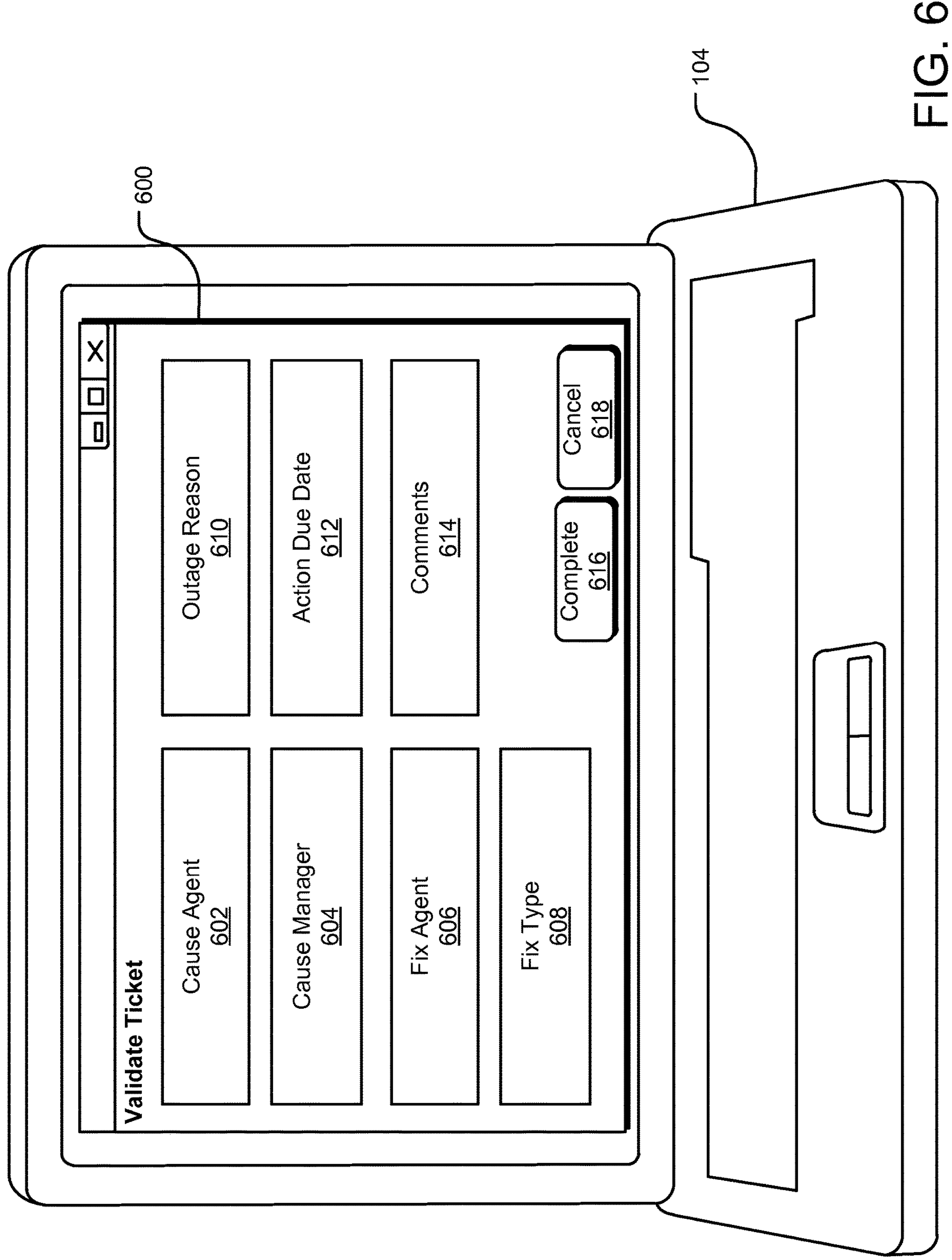
FIG. 6 illustrates an example validate ticket user interface displaying fields for inputting investigation information and performance management information.

FIG. 6 illustrates the validate ticket user interface 600 displaying fields for inputting investigation information and performance management information. In one implementation, the validate ticket user interface 600 includes fields specifying various personnel involved in the management and validation of the ticket. For example, a cause agent field 602, a cause manager field 604, and a fix agent field 606 are provided for identifying the person who caused the outage, the person managing the person who caused the outage, and the person managing the performance management strategy, respectively. In one implementation, one or more of the fields 602-606 are automatically populated from a database or searched for and selected from a list stored in the database. The investigation information includes an outage reason 610 detailing the root cause of the network outage. The performance management information includes a fix type 608 listing at least one preventative measure and an action due date 612 for completing the preventative measure. A comments field 614 is included for any additional comments on the investigation information and/or the performance management information. A complete button 616 completes the validation of the ticket, and a cancel button 618 cancels the validation. In one implementation, selection of the complete button 616 sends an email or other notification to interested parties.

Figure 7:
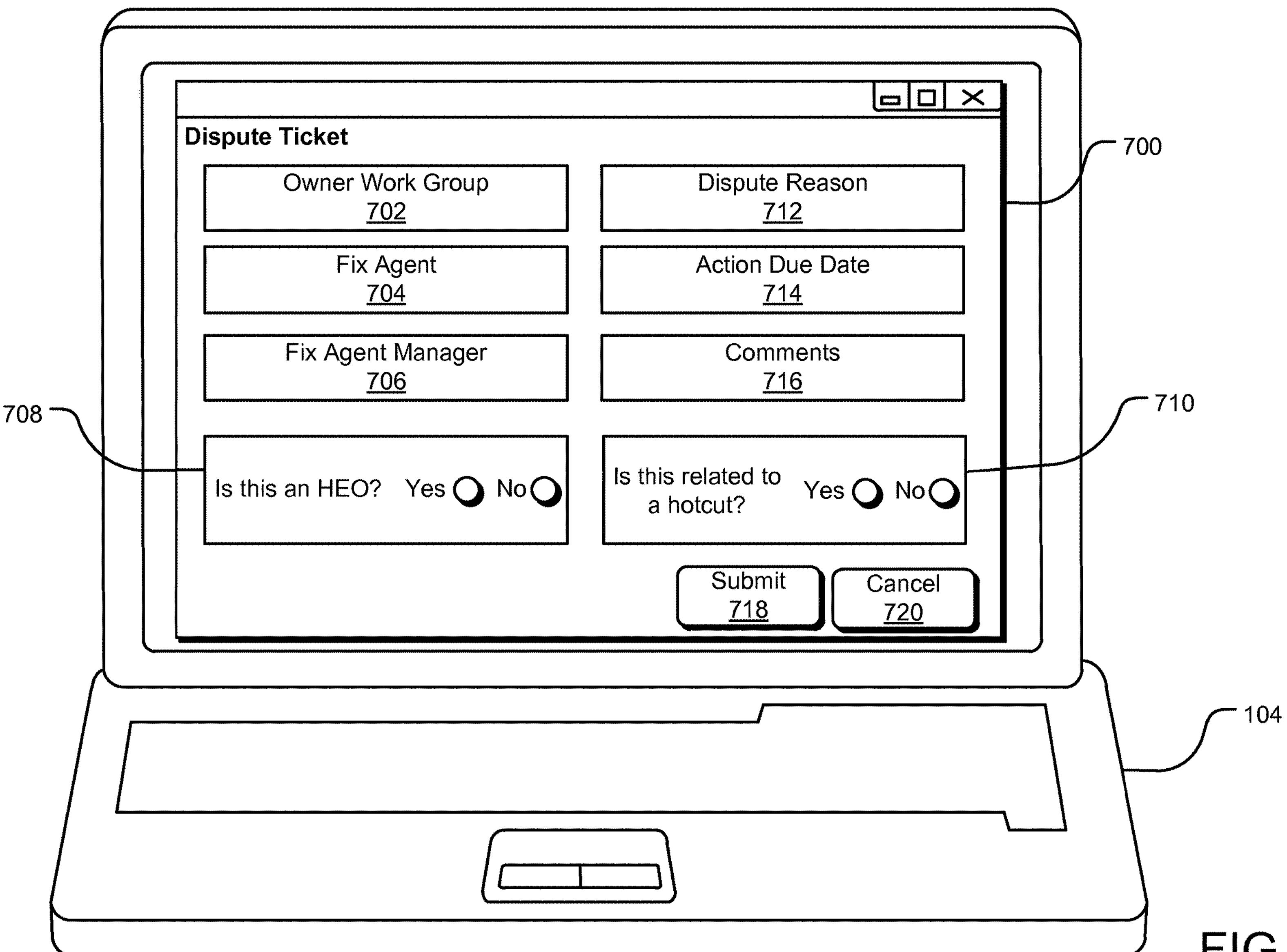
FIG. 7 displays an example dispute ticket user interface displaying fields for inputting information to dispute responsibility for a ticket.

Turning to FIG. 7, the dispute ticket user interface 700 is shown displaying fields for inputting information to dispute responsibility for a ticket. In one implementation, the dispute ticket user interface 700 includes fields specifying various teams and personnel for investigating the ticket after reassignment. In one implementation, one or more of the fields are automatically populated from a database or searched for and selected from a list stored in the database. For example, an owner work group field 702 identifying a team to which to reassign the ticket is provided. In one implementation, identifying the owner work group 702 automatically populates a fix agent 704 and fix agent manager 706. A box 708 includes an option for classifying the ticket as a human error outage. For example, the reason for the dispute may be that the network outage was not caused by a human error, but rather software, hardware, or other network components, and in that case, the “no” option would be selected in the box 708. Similarly, a box 710 includes an option for indicating whether the network outage was related to a hotcut, which generally involves change orders that interrupt live client traffic to make a planned change. Having the box 710 as an option allows the network outage tracker 102 to track the total network outages related to hotcuts. The dispute ticket user interface 700 further includes a dispute reason field 712 for detailing the nature of the dispute, an action due date 714 for responding to the dispute, and any comments 716. A submit button 718 submits the dispute, and a cancel button 720 cancels the dispute. In one implementation, selection of the submit button 718 sends an email or other notification to the fix agent 704, the fix agent manager 706, and/or other personnel reassigned to the ticket.

Figure 8:
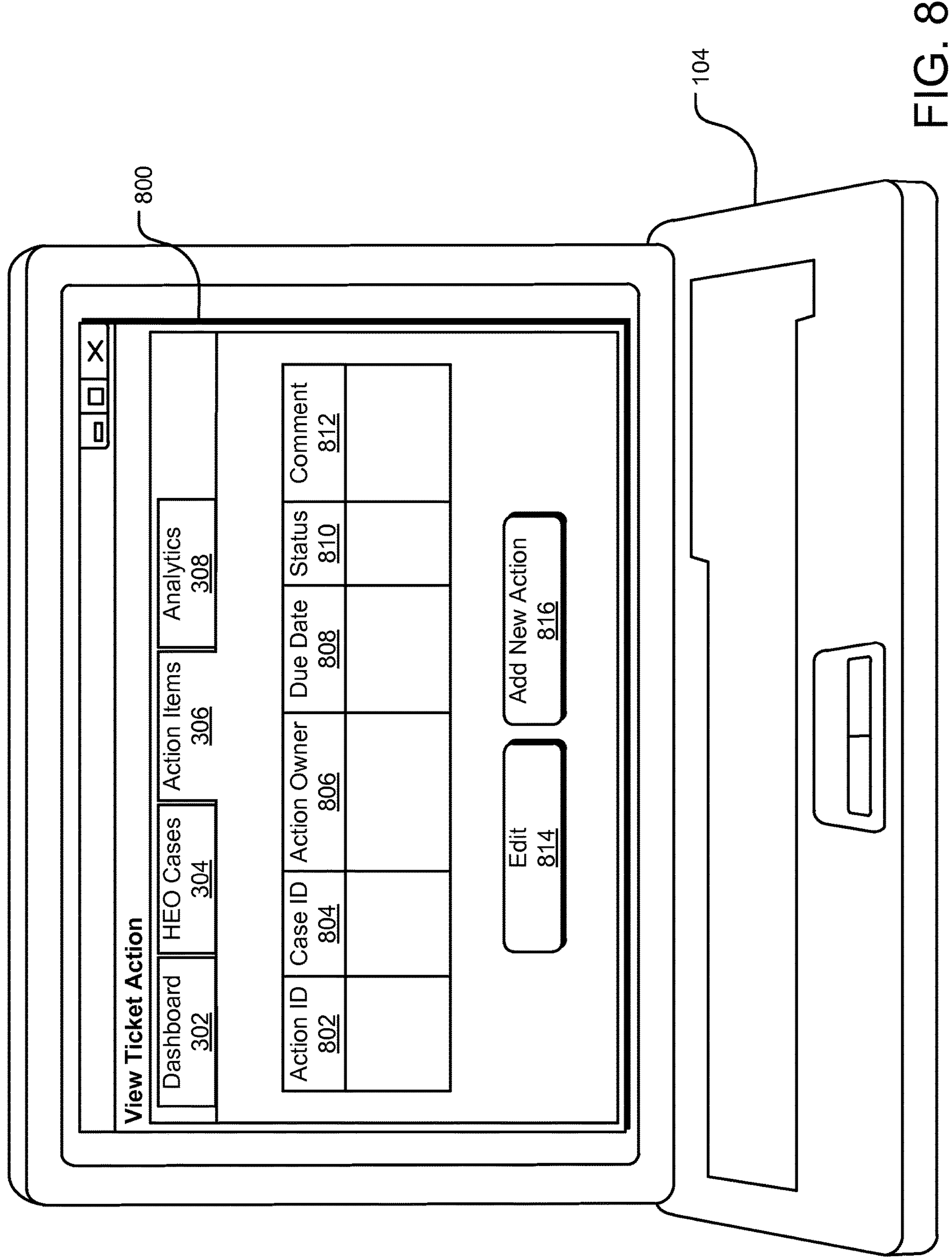
FIG. 8 illustrates an example view ticket action user interface displaying action items for performance management.

FIG. 8 illustrates an example view ticket action user interface 800 displaying action items associated with a single ticket for performance management. In one implementation, the view ticket action user interface 800 shows the action identification number 802, a case identification number 804 for the ticket, an action owner 806 responsible for managing the completion of the preventative measure, a due date 808 for completing the preventative measure, a status 810 of completing the preventative measure (e.g., open, closed, past due, etc.), and any comments 812. An edit button 814 opens an edit action user interface 1000 for editing the action item, and an add new action 816 adds a new action tied to the ticket.

Figure 9:
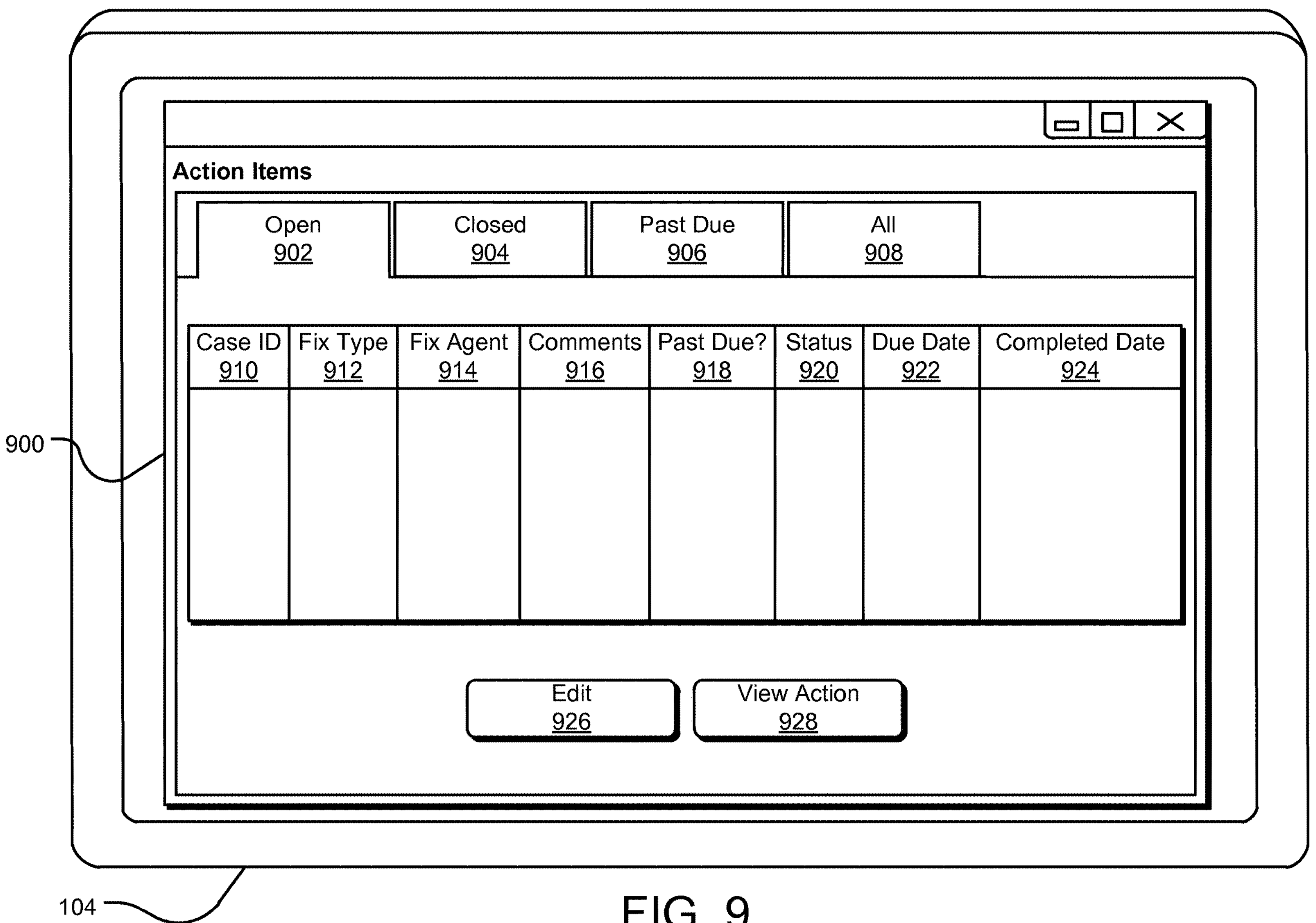
FIG. 9 shows an example action items user interface displaying open action items pending action by a responsible team.

FIG. 9 shows an example action items user interface 900 displaying action items for a responsible team filtered by status using tabs 902-908 is shown. In one implementation, the action items may be filtered using the tabs 902-908 to show tickets having an open status, a closed status, a past due status, and all action items, respectively. For the filtered action items, a list of information about the action items is shown with links to the individual action items for editing. In one implementation, the list includes a case identification number 910, a fix type 912 describing at least one preventative measure, a fix agent 914, any comments 916, an alert 918 indicating whether the action item is past due, a status 920, a due date 922 for completing the action item, and a completed date 924. An edit button 926 opens the edit action user interface 1000 for editing the action item, and a view action button 928 opens the view ticket action user interface 800.

Figure 10:
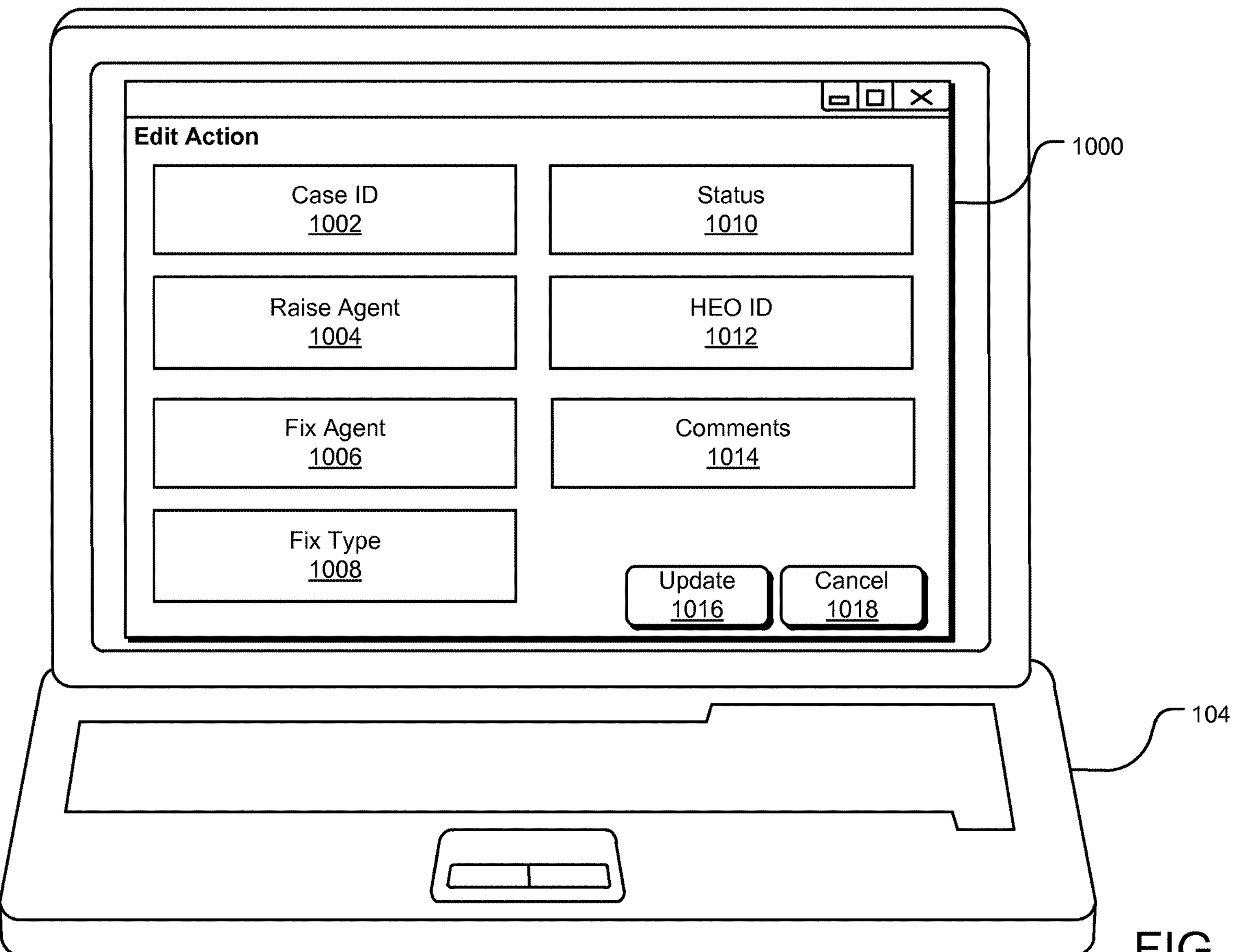
FIG. 10 illustrates an example edit action user interface displaying fields for editing an action item for a ticket.

FIG. 10 illustrates the edit action user interface 1000 displaying fields for editing an action item for a ticket. In one implementation, the edit action user interface 1000 includes an edit case identification number field 1002, an edit raise agent field 1004, an edit fix agent field 1006, an edit fix type field 1008, an edit status field 1010, an HEO identifier field 1012, and a comments field 1014. An update button 1016 updates the action item, and a cancel button 1018 cancels the edit.

Turning to FIGS. 11-19, example consolidated analytics are shown. In one implementation, consolidated analytics summarizing any outstanding actions are displayed on the dashboard 302 for quick reference, and other consolidated analytics may be retrieved using the analytics tab 308. In each of the FIGS. 11-19, the consolidated analytics are shown as a chart and a table.

Figure 11:
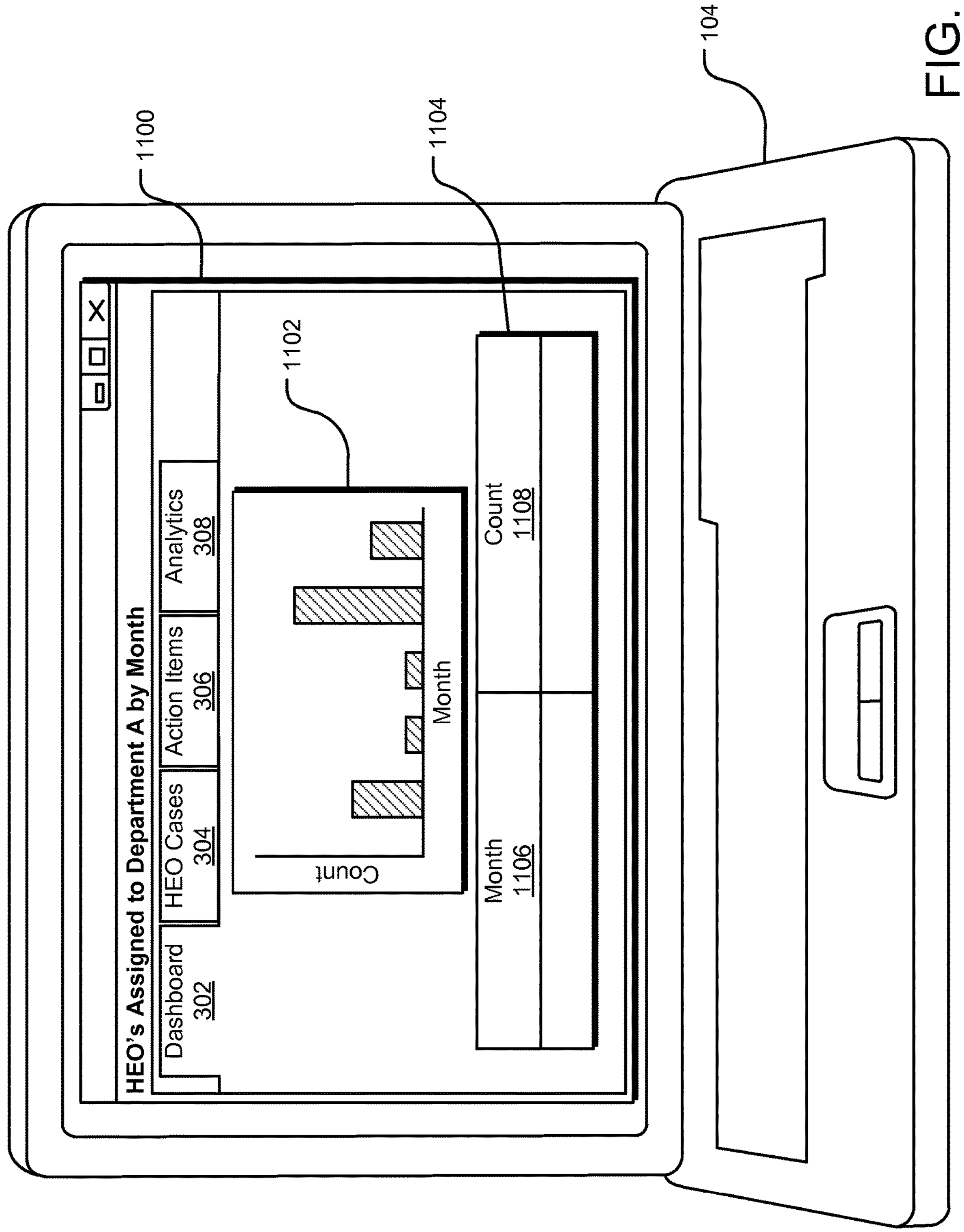
FIG. 11 displays an example dashboard user interface displaying consolidated analytics detailing human error outages assigned to a department by month.

FIG. 11 displays an example dashboard user interface 1100 displaying a chart 1102 and a table 1104 of consolidated analytics detailing a count of human error outages 1108 assigned to Department A by month 1106. The dashboard user interface 1100 provides a quick reference of the tickets for human error outages that were assigned to Department A each month that are pending first action by Department A.

Figure 12:
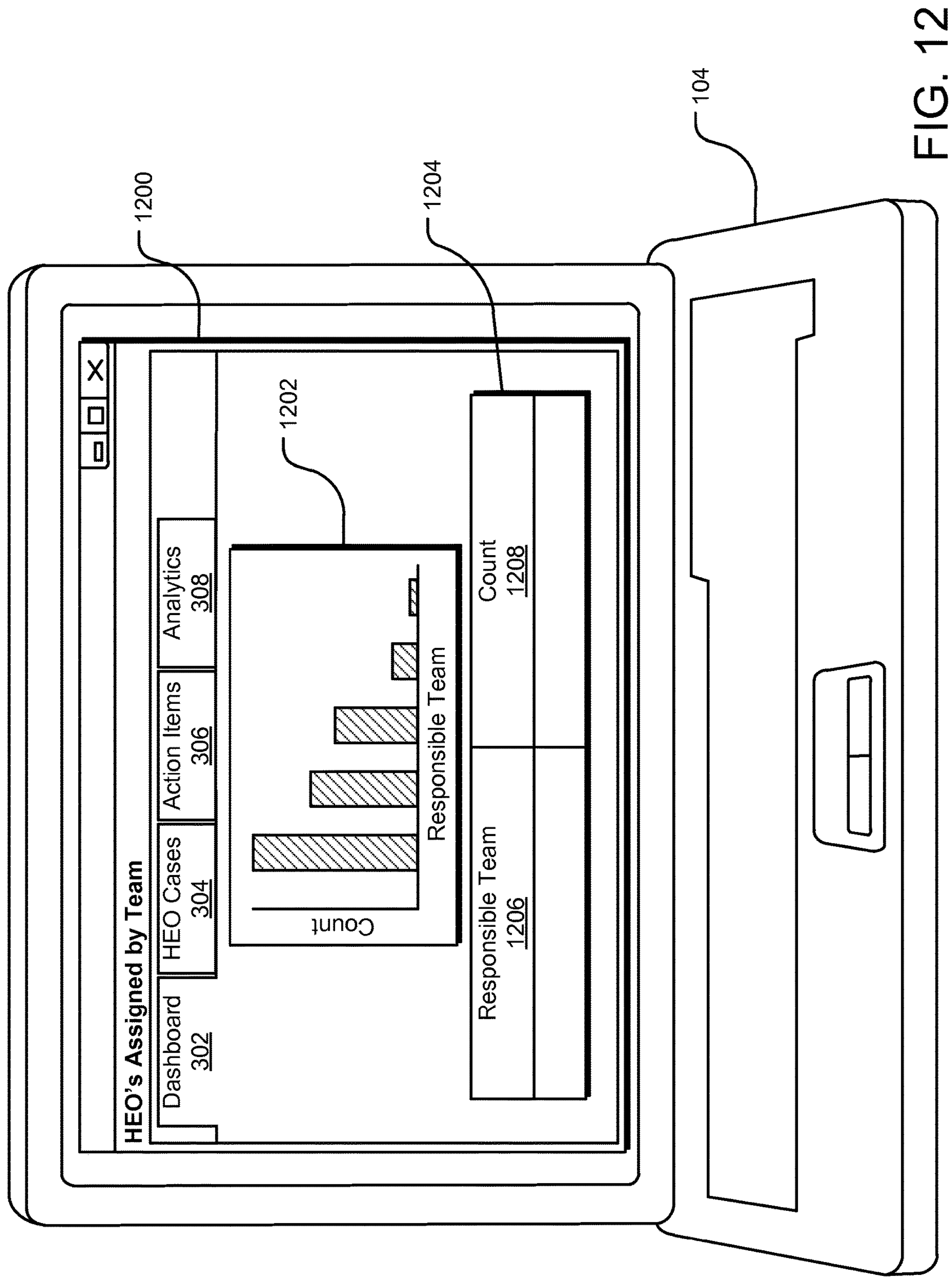
FIG. 12 shows another example dashboard user interface displaying consolidated analytics detailing human error outages assigned by teams in a department.

FIG. 12 shows another example dashboard user interface 1200 displaying a chart 1202 and a table 1204 of consolidated analytics detailing a count of human error outages 1208 assigned by responsible team 1206. In one implementation, each of the responsible teams 1206 are part of a department. For example, the department may be service delivery with the chart 1202 and table 1204 showing the count 1208 of tickets for human error outages assigned to each of the teams in service delivery, including, for example, provisioning disconnects, provisioning IP, provisioning transport, provisioning voice, customer care management, activations and scheduling, and order entry. The dashboard user interface 1200 provides a quick reference of the tickets for human error outages that were assigned to each of the teams in a department that are pending first action.

Figure 13:
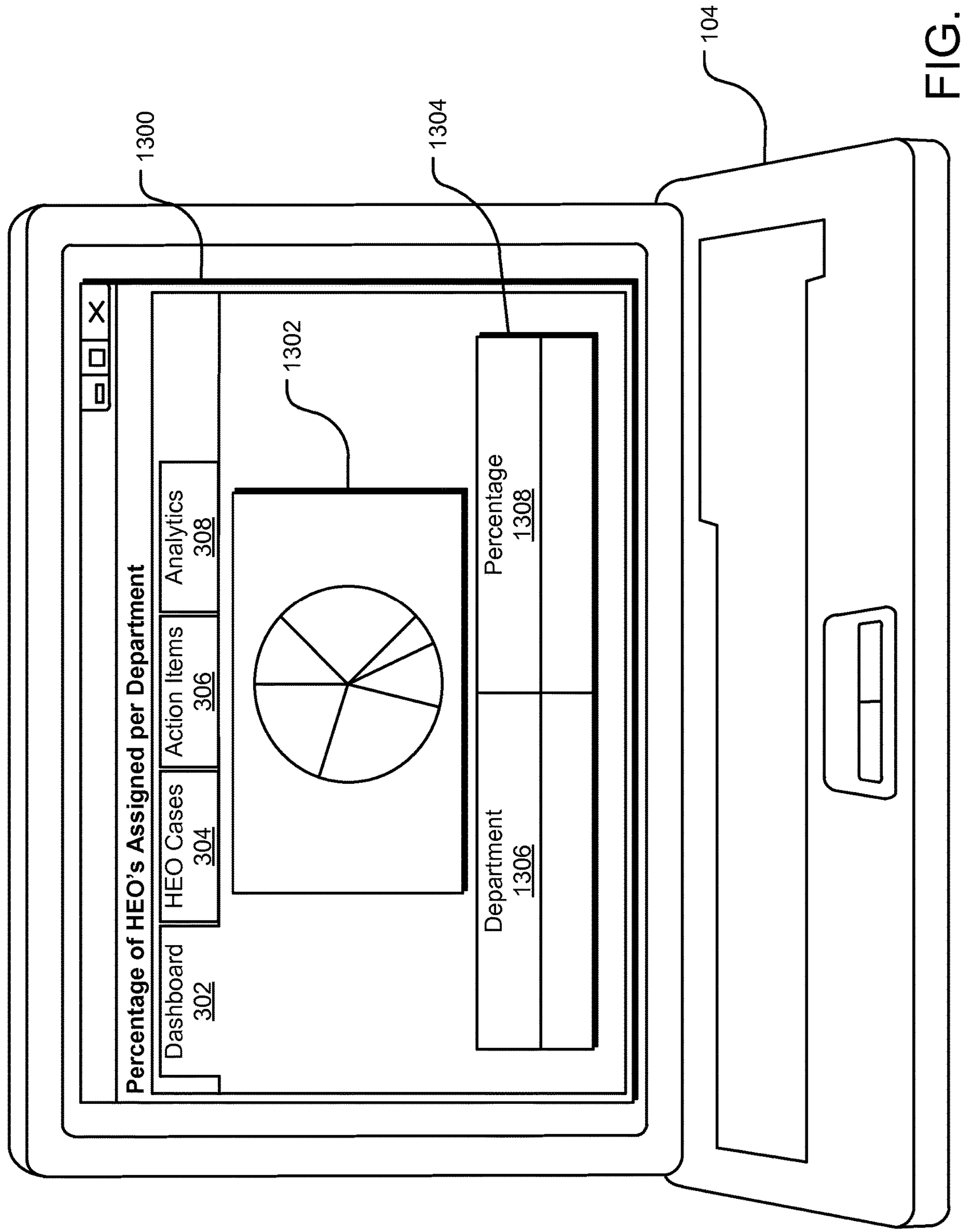
FIG. 13 illustrates another example dashboard user interface displaying consolidated analytics detailing a percentage of human error outages assigned per department.

FIG. 13 illustrates another example dashboard user interface 1300 displaying a pie chart 1302 and a table 1304 of consolidated analytics detailing a percentage of human error outages 1308 assigned per department 1306. The departments may include, for example, service delivery, service operations, implementations and translations, field operations, off-net operations, third party vendor, other on-net operations, and other. The dashboard user interface 1300 provides a quick reference of the tickets for human error outages that were assigned to each of the departments in a telecommunication provider that are pending first action.

Figure 14:
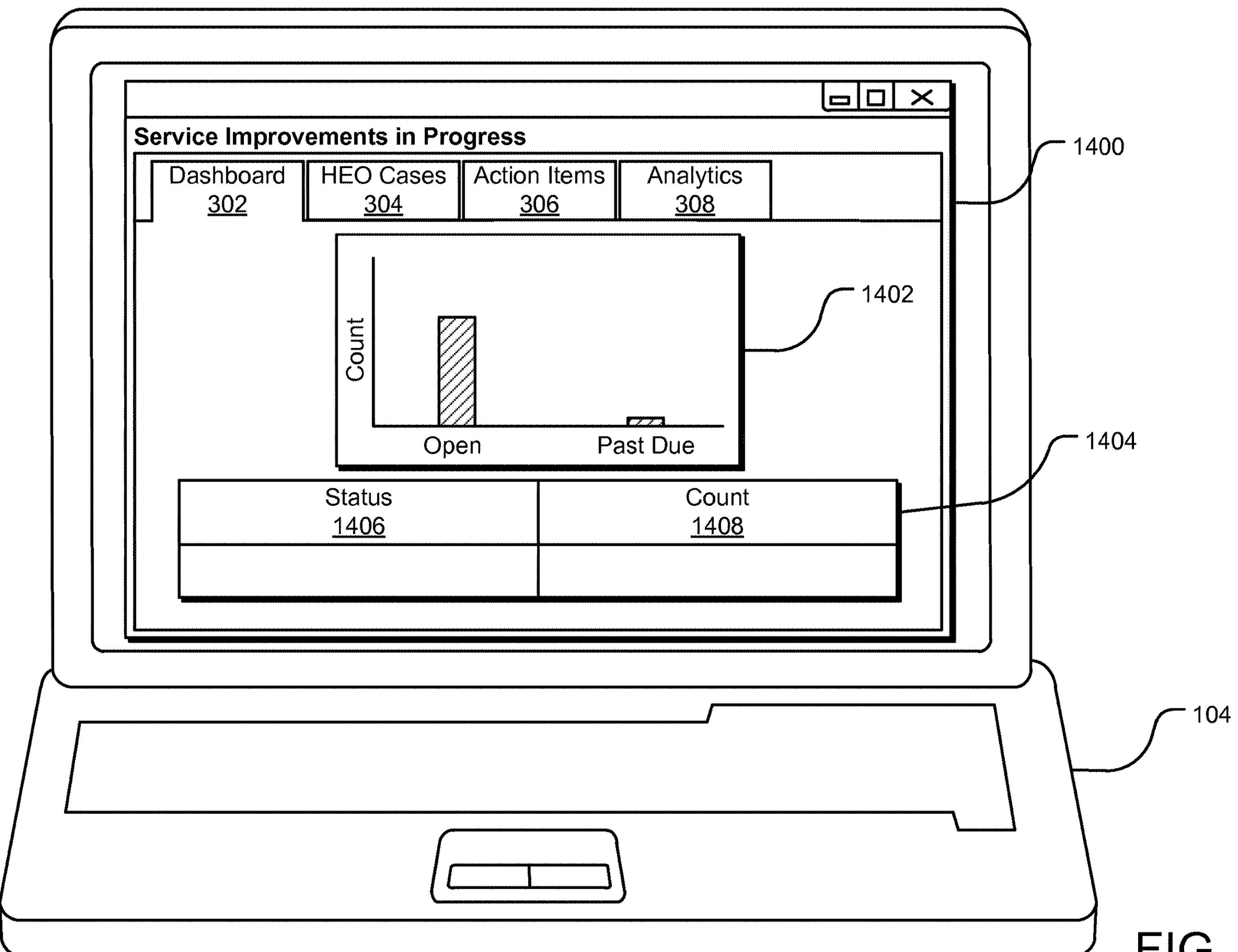
FIG. 14 shows another example dashboard user interface displaying consolidated analytics detailing service improvements in progress.
Figure 15:
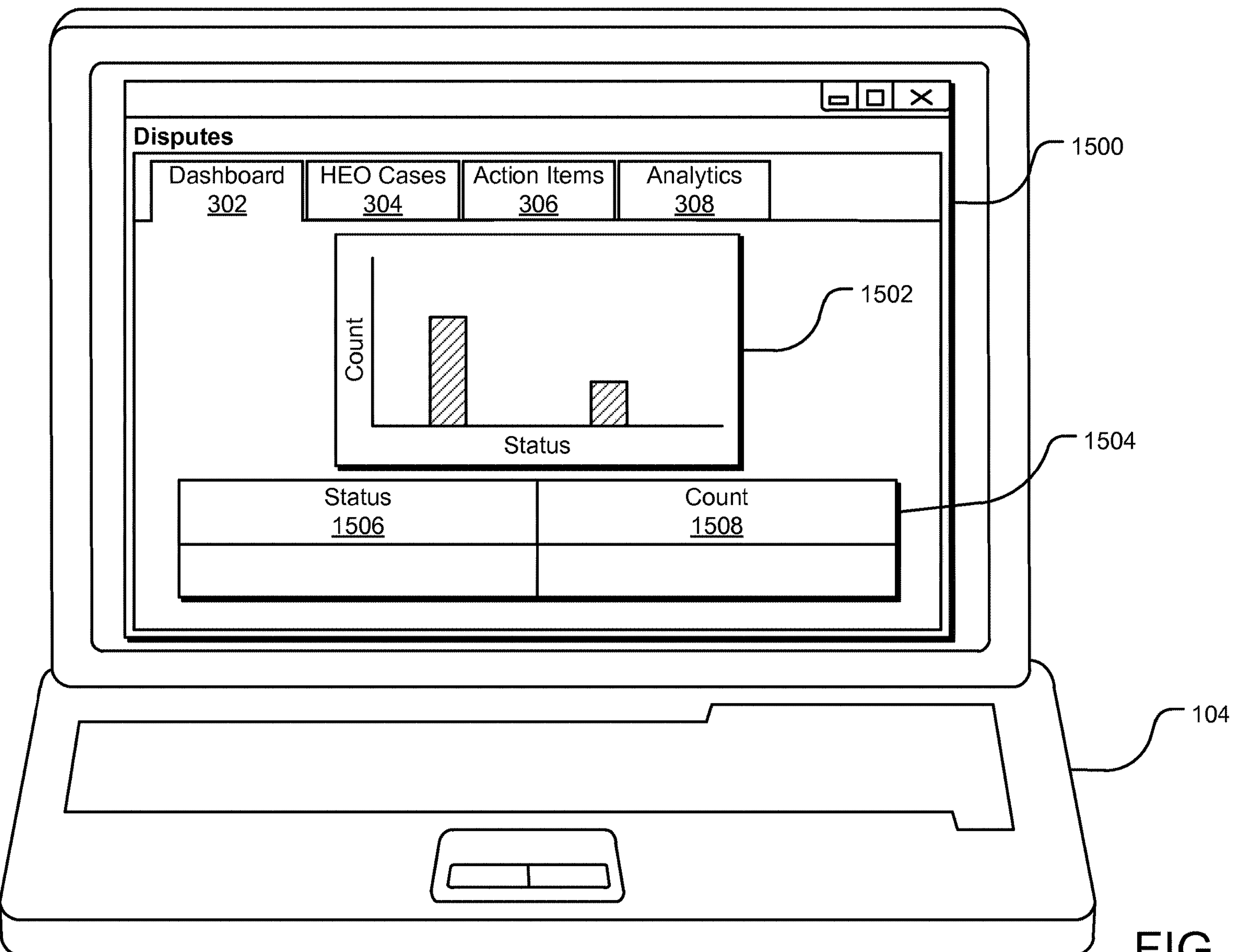
FIG. 15 shows another example dashboard user interface displaying consolidated analytics detailing a status of disputed tickets.

As can be understood from FIG. 14, another example dashboard user interface 1400 displaying a chart 1402 and a table 1404 of consolidated analytics detailing service improvements in progress is shown. The dashboard user interface 1400 provides a quick reference of a count 1408 of action items by a status 1406, such as open, closed, past due, and complete. For example, as shown in FIG. 14, a quick review of the chart 1402 shows several action items with an open status and a few with a past due status. Similarly, FIG. 15 shows another example dashboard user interface 1500 displaying a chart 1502 and a table 1504 of consolidated analytics detailing a status of disputed tickets. The dashboard user interface 1500 provides a quick reference of a count 1508 of disputed tickets by a status 1506, such as in progress and complete.

Figure 16:
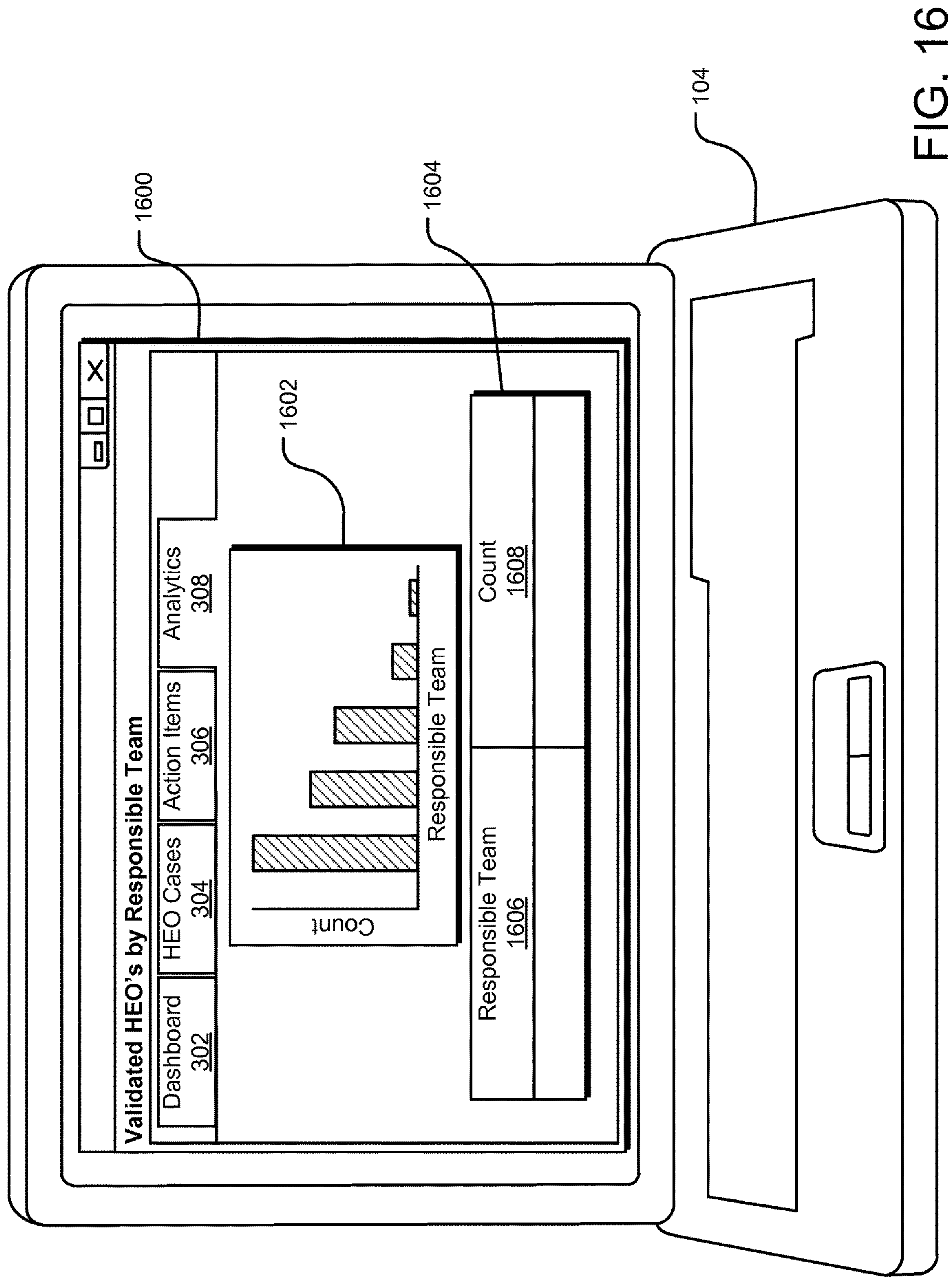
FIG. 16 depicts an example analytics user interface displaying consolidated analytics detailing validated human error outages by responsible team.

FIG. 16 depicts an example analytics user interface 1600 displaying a chart 1602 and a table 1604 of consolidated analytics detailing a count 1608 of validated human error outages by responsible team 1606 in a department. In one implementation, each of the responsible teams 1606 are part of a department. For example, the department may be service delivery with the chart 1602 and table 1604 showing the count 1608 of tickets for human error outages assigned to each of the teams in service delivery, including, for example, provisioning disconnects, provisioning IP, provisioning transport, provisioning voice, customer care management, activations and scheduling, and order entry. The analytics user interface 1600 provides a quick reference of the tickets for human error outages that were validated by each of the teams in a department. Further, the analytics user interface 1600 may be used to determine if any particular teams in a department are causing an abnormal amount of human error outages and to track any changes in the amount validated by any of the teams.

Figure 17:
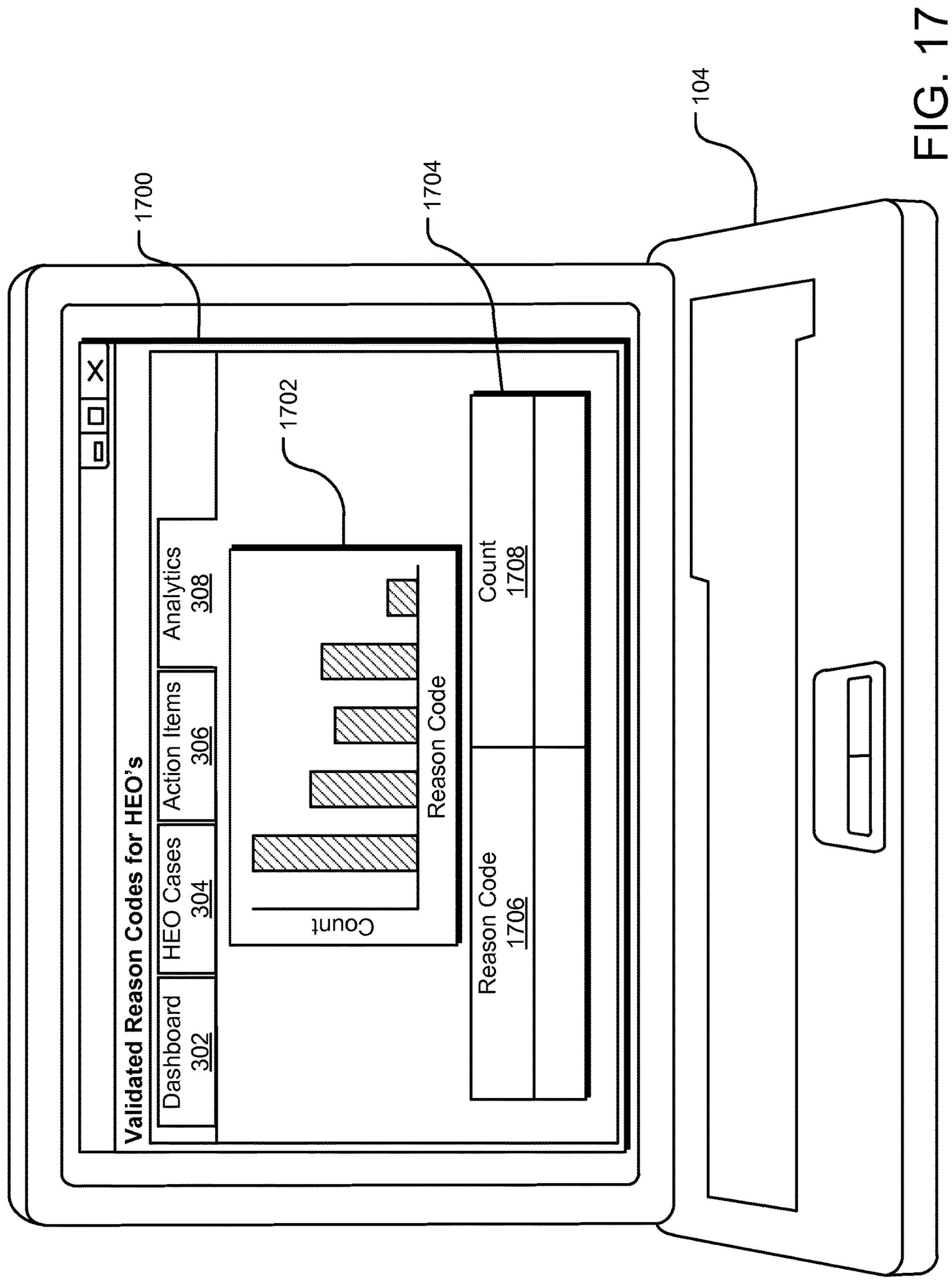
FIG. 17 depicts another example analytics user interface displaying consolidated analytics detailing validated reason codes for human error outages.

FIG. 17 depicts another example analytics user interface 1700 displaying a chart 1702 and a table 1704 of consolidated analytics detailing a count 1708 of validated reason codes 1706 for human error outages. For example, the validated reason codes 1706 may be improper coding change, fiber cut issue, disconnect processed incorrectly, port shut down in error, wrong circuit disconnected, or the like. The analytics user interface 1700 provides a quick reference of the root causes of human error outages that were validated by one or more teams. Further, the analytics user interface 1700 may be used to determine if any particular root cause is occurring with an abnormal frequency and to track any changes in the amount validated root causes to monitor and determine progress in addressing and preventing the root causes.

Figure 18:
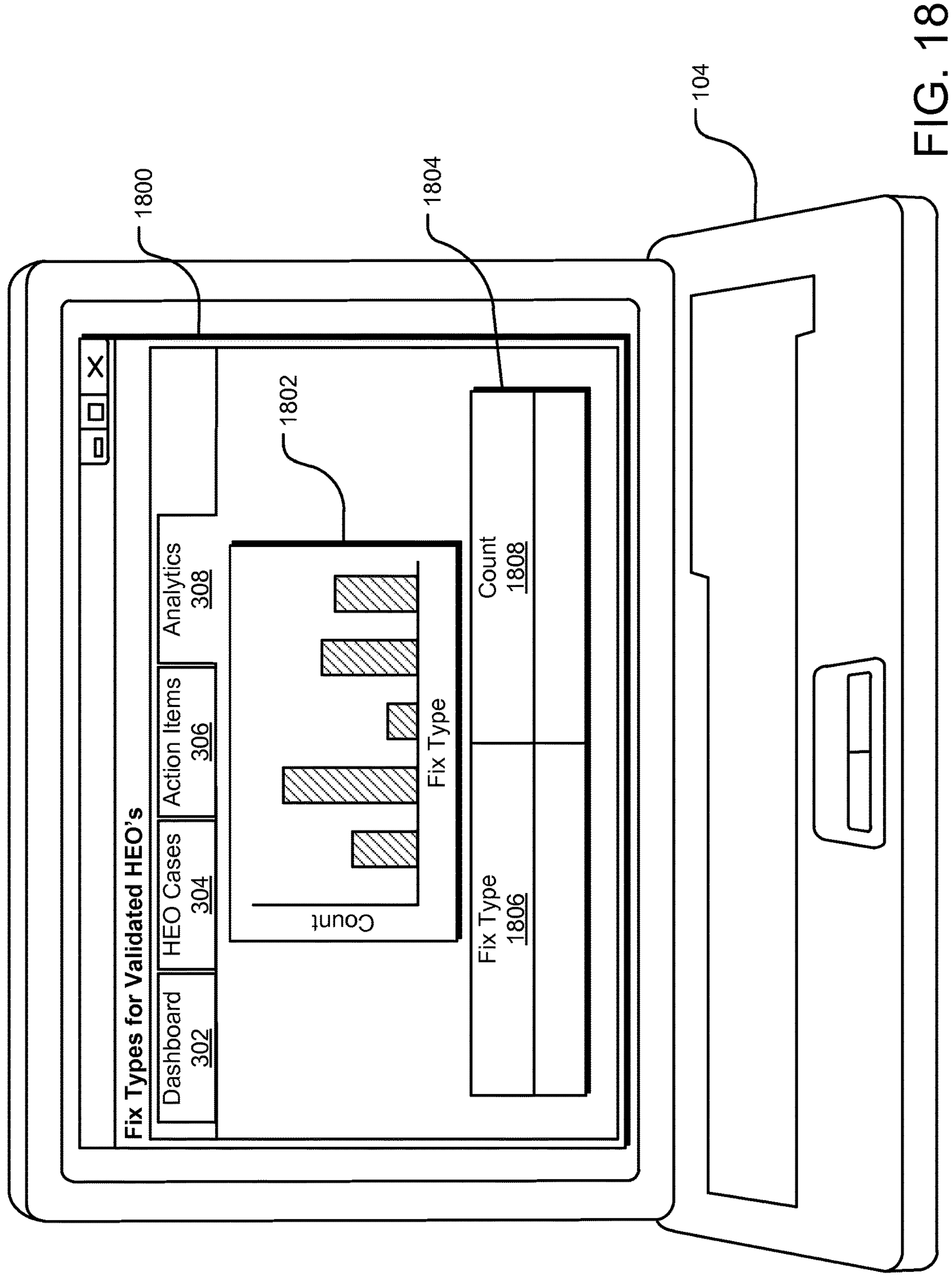
FIG. 18 depicts another example analytics user interface displaying consolidated analytics detailing fix types for validated human error outages.

FIG. 18 depicts another example analytics user interface 1800 displaying a chart 1802 and a table 1804 of consolidated analytics detailing a count 1808 of fix types 1806 for validated human error outages. For example, the fix types 1806 may include preventative measures, such as increase personnel training, create new reference documentation, eliminate or add personnel or other resources, or the like. The analytics user interface 1800 provides a quick reference of preventative measures that were identified for validated tickets by one or more teams. Further, the analytics user interface 1800 may be used to determine if any particular preventative measure is high or low to determine how to allocate resources.

Figure 19:
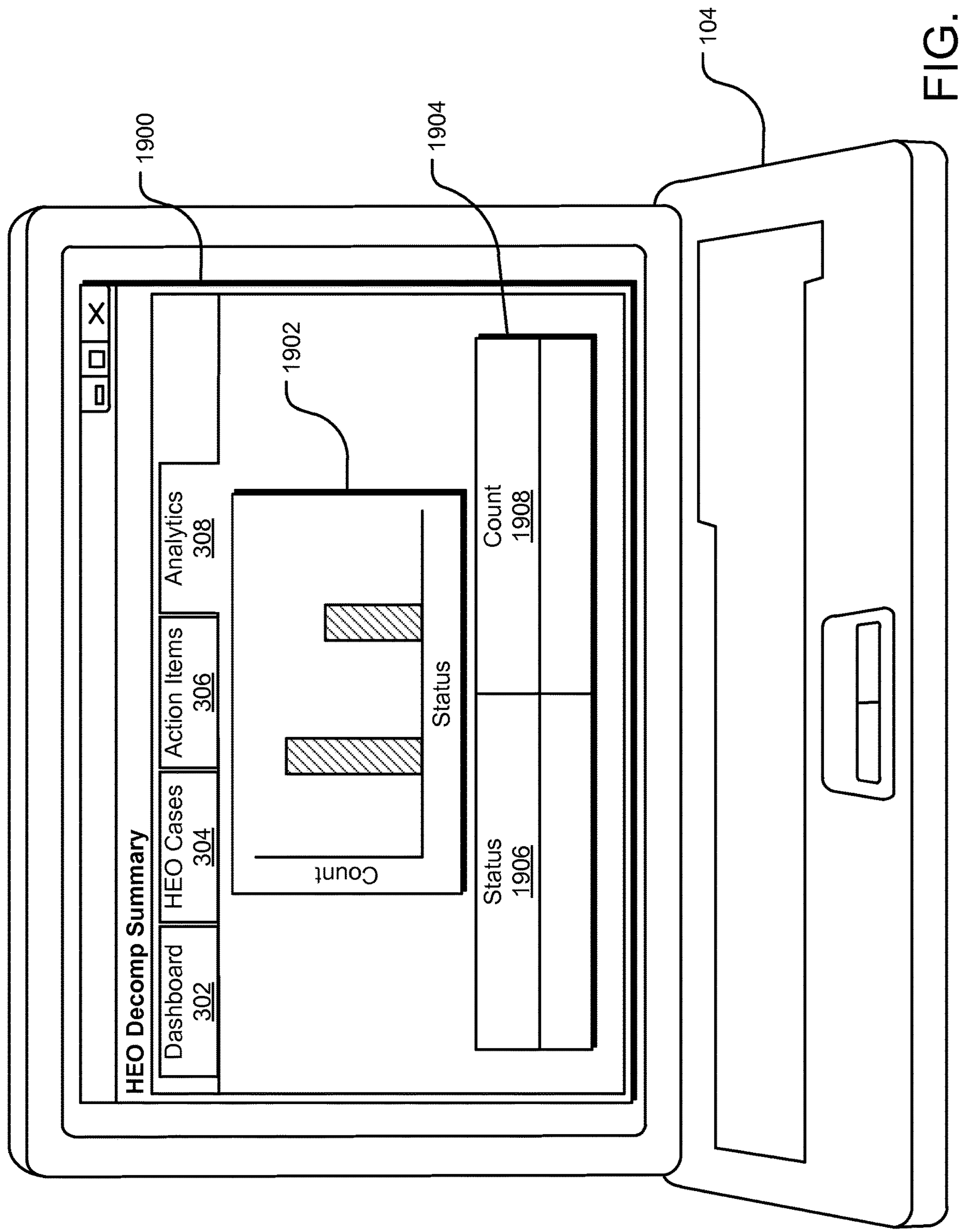
FIG. 19 depicts another example analytics user interface displaying consolidated analytics detailing a summary of human error outages.

FIG. 19 depicts another example analytics user interface 1900 displaying a chart 1902 and a table 1904 of consolidated analytics detailing a summary of the status of all tickets. The analytics user interface 1900 provides a quick reference of a count 1908 of all tickets by a status 1906, such as in progress and complete.

Figure 20:
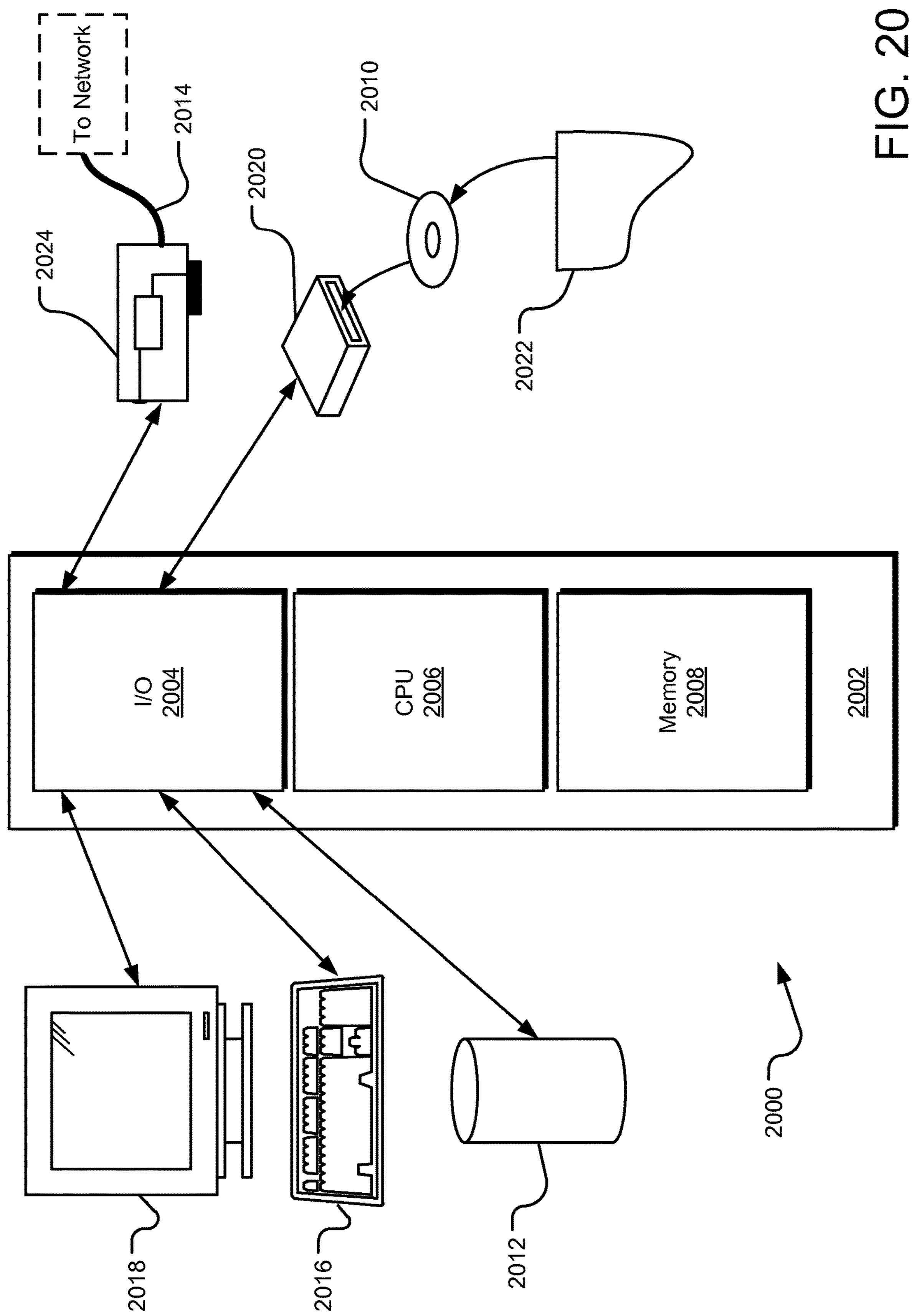
FIG. 20 is an example computing system that may be specifically configured to implement the various systems and methods discussed herein.

Referring to FIG. 20, a detailed description of an example computing system 2000 having one or more computing units that may implement various systems and methods discussed herein is provided. The computing system 2000 may be applicable to the user device 104, the server, or other computing devices. It will be appreciated that specific implementations of these devices may be of differing possible specific computing architectures not all of which are specifically discussed herein but will be understood by those of ordinary skill in the art.

The computer system 2000 may be a general computing system is capable of executing a computer program product to execute a computer process. Data and program files may be input to the computer system 2000, which reads the files and executes the programs therein. Some of the elements of a general purpose computer system 2000 are shown in FIG. 20 wherein a processor 2002 is shown having an input/output (I/O) section 2004, a Central Processing Unit (CPU) 2006, and a memory section 2008. There may be one or more processors 2002, such that the processor 2002 of the computer system 2000 comprises a single central-processing unit 2006, or a plurality of processing units, commonly referred to as a parallel processing environment. The computer system 2000 may be a conventional computer, a distributed computer, or any other type of computer, such as one or more external computers made available via a cloud computing architecture. The presently described technology is optionally implemented in software devices loaded in memory 2008, stored on a configured DVD/CD-ROM 2010 or storage unit 2012, and/or communicated via a wired or wireless network link 2014, thereby transforming the computer system 2000 in FIG. 20 to a special purpose machine for implementing the described operations.

The I/O section 2004 is connected to one or more user-interface devices (e.g., a keyboard 2016 and a display unit 2018), a disc storage unit 2012, and a disc drive unit 2020. In the case of a tablet or smart phone device, there may not be a physical keyboard but rather a touch screen with a computer generated touch screen keyboard. Generally, the disc drive unit 2020 is a DVD/CD-ROM drive unit capable of reading the DVD/CD-ROM medium 2010, which typically contains programs and data 2022. Computer program products containing mechanisms to effectuate the systems and methods in accordance with the presently described technology may reside in the memory section 2004, on a disc storage unit 2012, on the DVD/CD-ROM medium 2010 of the computer system 2000, or on external storage devices made available via a cloud computing architecture with such computer program products, including one or more database management products, web server products, application server products, and/or other additional software components. Alternatively, a disc drive unit 2020 may be replaced or supplemented by an optical drive unit, a flash drive unit, magnetic drive unit, or other storage medium drive unit. Similarly, the disc drive unit 2020 may be replaced or supplemented with random access memory (RAM), magnetic memory, optical memory, and/or various other possible forms of semiconductor based memories commonly found in smart phones and tablets.

The network adapter 2024 is capable of connecting the computer system 2000 to a network via the network link 2014, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets or slates, multimedia consoles, gaming consoles, set top boxes, etc.

When used in a LAN-networking environment, the computer system 2000 is connected (by wired connection or wirelessly) to a local network through the network interface or adapter 2024, which is one type of communications device. When used in a WAN-networking environment, the computer system 2000 typically includes a modem, a network adapter, or any other type of communications device for establishing communications over the wide area network. In a networked environment, program modules depicted relative to the computer system 2000 or portions thereof, may be stored in a remote memory storage device. It is appreciated that the network connections shown are examples of communications devices for and other means of establishing a communications link between the computers may be used.

In an example implementation, tickets, investigation information, performance management information, consolidated analytics, a plurality of internal and external databases, source databases, and/or cached data on servers are stored as the memory 2008 or other storage systems, such as the disk storage unit 2012 or the DVD/CD-ROM medium 2010, and/or other external storage devices made available and accessible via a network architecture. Network outage tracker software and other modules and services may be embodied by instructions stored on such storage systems and executed by the processor 2002.

Some or all of the operations described herein may be performed by the processor 2002. Further, local computing systems, remote data sources and/or services, and other associated logic represent firmware, hardware, and/or software configured to control operations of the network outage tracker 102, the user devices 104, and/or other computing units or components of the network environment 100. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 2002 and a user may interact with a Graphical User Interface (GUI) using one or more user-interface devices (e.g., the keyboard 2016, the display unit 2018, and the user devices 104) with some of the data in use directly coming from online sources and data stores. The system set forth in FIG. 20 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. One or more non-transitory tangible computer-readable storage media storing computer-executable instructions for performing a computer process on a computing system in a computing network, the computer process comprising:

receiving, by a network adapter of the computing system, a plurality of tickets from other computing devices in the computing network;

automatically identifying potential causes for network outages associated with the plurality of tickets;

based on the identified potential causes, automatically identifying an assigned team, from a plurality of teams, for investigating the network outages;

updating the tickets with the identified potential causes and identified assigned teams;

storing the tickets in one or more databases;

for each of the plurality of tickets, generating an alert to the identified assigned team, wherein the alert includes a prompt to validate or dispute the ticket;

tracking a status of each of the tickets, the status designated based on a responsibility of the assigned team for causing the network outage;

generating consolidated analytics based on the tracked statuses of the tickets; and outputting, by the network adapter of the computing system, the consolidated analytics to a user device in the computing network, wherein the status is designated validated upon the assigned team confirming responsibility for causing the network outage by validating the ticket, wherein the consolidated analytics includes:

a correlation of the tracked statuses that are designated new with at least one of the teams; and a correlation of the tracked statuses that are designated validated with at least one of: one or more root causes, and one or more preventative measures.

2. The one or more non-transitory tangible computer-readable storage media of claim 1, wherein the status is designated new where the assigned team is estimated to be responsible for causing the network outage.

3. The one or more non-transitory tangible computer-readable storage media of claim 1, wherein the status is designated disputed where the assigned team disputes responsibility for causing the network outage.

4. The one or more non-transitory tangible computer-readable storage media of claim 3, wherein the consolidated analytics includes a correlation of the tracked statuses that are designated disputed with at least one of the teams and a dispute status.

5. The one or more non-transitory tangible computer-readable storage media of claim 1, wherein the network outage is a human error outage.

6. The one or more non-transitory tangible computer-readable storage media of claim 1, wherein the consolidated analytics are output for display on a graphical user interface.

7. A method for improving performance of a network, the method comprising:

causing, by a network outage tracking server, the display of outage user interfaces on a plurality of computing devices in communication with the network outage tracking server;

based on data received via the outage user interfaces, automatically identifying for a plurality of outages, by the network outage tracking server, potential causes for outages;

for each outage in the plurality of outages, based on the identified potential cause for the outage, automatically identifying, by the network outage tracking server, a responsible team from a predefined list of teams stored in a database accessible by the network outage tracking server;

generating, based on input into the outage user interface, a plurality of tickets for the plurality of outages, each of the tickets including the identified responsible team for investigating the network outage and the identified potential cause for the outage;

for each of the plurality of tickets, generating, by the network outage tracking server, an alert to the identified responsible team, wherein the alert includes a prompt to validate or dispute the ticket;

tracking, by the network outage tracking server, a status of each of the tickets, the status designated based on a responsibility of the assigned team for causing the network outage, wherein the status is designated validated upon the identified responsible team confirming responsibility for causing the network outage;

generating, by the network outage tracking server, at least one preventative measure and action item based on one or more the identified potential causes for the outages;

generating, by the network outage tracking server, consolidated analytics based on the tracked statuses of the tickets; and causing, by the network outage tracking server, display of the consolidated analytics and the preventative measures, wherein the consolidated analytics includes:

a correlation of the tracked statuses that are designated new with at least one of the teams; and a correlation of the tracked statuses that are designated validated with at least one of one or more root causes.

8. The method of claim 7, wherein the outage user interface displays a selectable set of predefined errors.

9. The method of claim 8, further comprising in response to the prompt, receiving a dispute indication; and based on receiving the dispute indication, automatically reassigning the responsible team or changing the cause for the outage.

10. The method of claim 9, further comprising, causing the display of a navigation user interface, the navigation user interface including a plurality of selectable tabs including a dashboard tab and an action items tab.

11. The method of claim 10, further comprising:

receiving a selection of the action items tab;

in response to receiving the selection of the action items tab, causing the display of an action items user interface, wherein the action items user interface includes the at least one preventative measure for a ticket.

12. The method of claim 10, further comprising:

receiving a selection of the dashboard tab;

in response to receiving the selection of the dashboard tab, causing the display of a summary of tickets.

13. The method of claim 7, further comprising causing the display of a search tickets interface, the search tickets interface including a team search criteria input element, an outage reason search criteria input element, and a fix type search criteria input element.

14. The method of claim 7, wherein the prompt includes an accept button to validate the ticket and a dispute button to dispute the ticket.

* * * * *